United States Patent
Forrest et al.

(10) Patent No.: US 7,253,614 B2
(45) Date of Patent: Aug. 7, 2007

(54) PROXIMITY DETECTOR HAVING A SEQUENTIAL FLOW STATE MACHINE

(75) Inventors: Glenn A. Forrest, Bow, NH (US); James M. Bailey, Concord, NH (US); Washington Lamar, Mont Vernon, NH (US)

(73) Assignee: Allegro Microsystems, Inc., Worcester, MA (US)

( * ) Notice: Subject to any disclaimer, the term of this patent is extended or adjusted under 35 U.S.C. 154(b) by 376 days.

(21) Appl. No.: 11/085,648

(22) Filed: Mar. 21, 2005

(65) Prior Publication Data

US 2006/0208729 A1    Sep. 21, 2006

(51) Int. Cl.
*G01B 7/14* (2006.01)

(52) U.S. Cl. .............................. 324/207.26; 324/207.25

(58) Field of Classification Search ........... 324/207.13, 324/207.18, 207.2–207.22, 207.24, 207.25, 324/207.26, 251, 207.12; 338/32 R, 32 H; 73/514.31, 514.39

See application file for complete search history.

(56) References Cited

U.S. PATENT DOCUMENTS

| | | | |
|---|---|---|---|
| 3,304,434 A | 2/1967 | Koster | |
| 4,185,265 A | 1/1980 | Griffin et al. | |
| 4,225,939 A | 9/1980 | Yashiro | |
| 4,283,679 A | 8/1981 | Ito et al. | |
| 4,293,814 A | 10/1981 | Boyer | |
| 4,367,721 A | 1/1983 | Boyer | |
| 4,374,333 A | 2/1983 | Avery | |
| 4,443,716 A | 4/1984 | Avery | |
| 4,476,901 A | 10/1984 | Sainen | |
| 4,513,403 A | 4/1985 | Troy | |
| 4,642,555 A | 2/1987 | Swartz et al. | |
| 4,649,796 A | 3/1987 | Schmidt | |
| 4,705,964 A | 11/1987 | Higgs | |
| 4,893,027 A | 1/1990 | Kammerer et al. | |
| 4,906,928 A | 3/1990 | Gard | |
| 4,992,731 A | 2/1991 | Lorenzen | |
| 5,291,133 A | 3/1994 | Gokhale et al. | |
| 5,317,258 A | 5/1994 | Setzer et al. | |
| 5,332,956 A | 7/1994 | Oh | |
| 5,442,283 A | 8/1995 | Vig et al. | |
| 5,459,398 A | 10/1995 | Hansen et al. | |
| 5,477,142 A | 12/1995 | Good et al. | |
| 5,486,759 A | 1/1996 | Seiler et al. | |

(Continued)

FOREIGN PATENT DOCUMENTS

DE    196 50 935 A1    6/1998

(Continued)

OTHER PUBLICATIONS

PCT Search Report & WrittenOpenion of the ISA for PCT/US2006/007824 dated Jul. 7, 2006.

(Continued)

*Primary Examiner*—Bot LeDynh
(74) *Attorney, Agent, or Firm*—Daly, Crowley, Mofford & Durkee, LLP

(57) ABSTRACT

A proximity detector has a sequential flow state machine to identify states associated with a magnetic field signal provided by a magnetic field sensing element. The proximity detector can include a vibration processor to identify a vibration in response to the states.

22 Claims, 13 Drawing Sheets

U.S. PATENT DOCUMENTS

| | | | |
|---|---|---|---|
| 5,493,219 | A | 2/1996 | Makino et al. |
| 5,497,084 | A | 3/1996 | Bicking |
| 5,510,706 | A | 4/1996 | Good |
| 5,650,719 | A | 7/1997 | Moody et al. |
| 5,694,038 | A | 12/1997 | Moody et al. |
| 5,696,790 | A | 12/1997 | Graham et al. |
| 5,729,130 | A | 3/1998 | Moody et al. |
| 5,917,320 | A | 6/1999 | Scheller et al. |
| 6,091,239 | A | 7/2000 | Vig et al. |
| 6,242,904 | B1 | 6/2001 | Shirai et al. |
| 6,279,248 | B1 | 8/2001 | Walters |
| 6,297,627 | B1 | 10/2001 | Towne et al. |
| 6,492,804 | B2 | 12/2002 | Tsuge et al. |
| 6,653,968 | B1 | 11/2003 | Schneider |
| 6,693,419 | B2 | 2/2004 | Stauth et al. |
| 6,815,944 | B2 | 11/2004 | Vig et al. |
| 2001/0002791 | A1 | 6/2001 | Tsuge et al. |
| 2004/0062362 | A1 | 4/2004 | Matsuya |
| 2005/0040814 | A1 | 2/2005 | Vig et al. |
| 2005/0194970 | A1 | 9/2005 | Scheller et al. |
| 2005/0225318 | A1 | 10/2005 | Bailey et al. |
| 2005/0225319 | A1 | 10/2005 | Bailey et al. |

FOREIGN PATENT DOCUMENTS

| | | |
|---|---|---|
| DE | 199 61 504 A1 | 6/2001 |
| WO | WO 96/23198 | 1/1996 |
| WO | WO 2003/069358 | 8/2003 |

OTHER PUBLICATIONS

"ATS612LSB Advance Information Data Sheet;" Data Sheet 27627-101; Allegro Microsystems, Inc.; Sep. 6, 1996; pp. 1-16.

"ATS630, ATS631: True Power On, Self-Calibrating Zero Speed Gear-Tooth Sensor System;" Allegro Microsystems, Inc.; Rev. 2.6; Preliminary; Subject to Change; no date; pp. 1-8.

"ATS630LSA, ATS631LSA: Zero-Speed, Self-Calibrating Hall-Effect Gear-Tooth True Power-On Sensors;" Allegro Microsystems, Inc.; Data sheet 27627.120; Oct. 28, 1996; 12 sheets.

Fletcher; "An Engineering Approach To Digital Design;" Library of Congress Cataloging in Publication Data; ISBN 0-13-277699-5; Prentice-Hall, Inc.; 1980; pp. 14 & 18-19.

Graeme et al.; "Operational Amplifiers Design & Application;" McGraw-Hill Book Company; 1971; pp. 352-353.

"Data Acquisition and Conversion Handbook;" Library of Congress Cataloging in Publication Data; ISBN 0-9602946-0-0; Datel-Intersil; 1979; pp. 16-17.

"Motorola Linear/Interface Integrated Circuits;" Series D Data Sheet; 1983; 2 sheets.

Bailey et al; "Methods and Apparatus for Vibration Detection;" U.S. Appl. No. 10/820,957, filed On Apr. 8, 2004; Specification and Drawings as Filed.

Bailey et al; "Methods and Apparatus for Vibration Detection;" U.S. Appl. No. 10/942,577, filed On Sep. 16, 2004; Specification and Drawings as Filed.

PCT Search Report of the ISA for PCT/US2003/02489 dated Nov. 19, 2003.

Infineon Technologies; "Differential Two-Wire Hall Effect Sensor IC;" TLE4942 Preliminary Data Sheet; Jun. 2000; pp. 1-13.

Robert Bosch GMBH Stuttgart; "Active Sensor for ABS/ASR/VDC-Systems with 2-Wire-Current Interface;" Specification TLE4941/TLE4942; Version 5; Jul. 25, 2000; 44 pages.

PROXIMITY DETECTOR HAVING A SEQUENTIAL FLOW STATE MACHINE

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates to proximity detectors, and more particularly, to a proximity detector that has a sequential flow state machine.

BACKGROUND OF THE INVENTION

Proximity detectors (also referred to herein as rotation detectors) for detecting ferrous or magnetic objects are known. One application for such devices is in detecting the approach and retreat of each tooth of a rotating ferrous object, such as a ferrous gear. The magnetic field associated with the ferrous object is often detected by one or more magnetic field-to-voltage transducers (also referred to herein as magnetic field sensing elements), such as Hall elements or magnetoresistive devices, which provide a signal proportional to a detected magnetic field (i.e., a magnetic field signal). The proximity detector processes the magnetic field signal to generate an output signal that changes state each time the magnetic field signal crosses a threshold. Therefore, when the proximity detector is used to detect the approach and retreat of each tooth of a rotating ferrous gear, the output signal is a square wave representative of rotation of the ferrous gear.

In one type of proximity detector, sometimes referred to as a peak-to-peak percentage detector (also referred to as a threshold detector), a threshold signal is equal to a percentage of the peak-to-peak magnetic field signal. One such peak-to-peak percentage detector is described in U.S. Pat. No. 5,917,320 entitled "Detection of Passing Magnetic Articles while Periodically Adapting Detection Threshold," which is assigned to the assignee of the present invention.

Another type of proximity detector, sometimes referred to as a slope-activated or a peak-referenced detector (also referred to herein as a peak detector), is described in U.S. Pat. No. 6,091,239 entitled "Detection of Passing Magnetic Articles with a Peak-Referenced Threshold Detector," which is assigned to the assignee of the present invention. Another such peak-referenced proximity detector is described in U.S. patent application Ser No. 6,693,419 entitled "Proximity Detector," which is assigned to the assignee of the present invention. In the peak-referenced proximity detector, the threshold signal differs from the positive and negative peaks (i.e., the peaks and valleys) of the magnetic field signal by a predetermined amount. Thus, in this type of proximity detector, the output signal changes state when the magnetic field signal comes away from a peak or valley by the predetermined amount.

In order to accurately detect the proximity of the ferrous object, the proximity detector must be capable of closely tracking the magnetic field signal. Typically, one or more digital-to-analog converters (DACs) are used to generate a DAC signal, which tracks the magnetic field signal. For example, in the above-referenced U.S. Pat. Nos. 5,917,320 and 6,091,239, two DACs are used, one to track the positive peaks of the magnetic field signal (PDAC) and the other to track the negative peaks of the magnetic field signal (NDAC). And in the above-referenced U.S. Pat. No. 6,693,419, a single DAC tracks both the positive and negative peaks of the magnetic field signal.

The magnetic field associated with the ferrous object and the resulting magnetic field signal are proportional to the distance between the ferrous object, for example the rotating ferrous gear, and the magnetic field sensing elements, for example, the Hall elements, used in the proximity detector. This distance is referred to herein as an "air gap." As the air gap increases, the magnetic field sensing elements tend to experience a smaller magnetic field from the rotating ferrous gear, and therefore smaller changes in the magnetic field generated by passing teeth of the rotating ferrous gear.

Proximity detectors have been used in systems in which the ferrous object (e.g., the rotating ferrous gear) not only rotates, but also vibrates. For the ferrous gear capable of unidirectional rotation about an axis of rotation in normal operation, the vibration can have at least two vibration components. A first vibration component corresponds to a "rotational vibration," for which the ferrous gear vibrates back and forth about its axis of rotation. A second vibration component corresponds to "translational vibration," for which the above-described air gap dimension vibrates. The rotational vibration and the translational vibration can occur even when the ferrous gear is not otherwise rotating in normal operation. Both the first and the second vibration components, separately or in combination, can generate an output signal from the proximity detector that indicates rotation of the ferrous gear even when the ferrous gear is not rotating in normal operation.

A proximity detector adapted to detect and to be responsive to rotational vibration and translational vibration is described, for example, in U.S. patent application Ser. No. 10/820,957, filed Apr. 8, 2004 and U.S. patent application Ser. No. 10/942,577, filed Sep. 16, 2004, each entitled "Methods and Apparatus for Vibration Detection," and each assigned to the assignee of the present invention.

Proximity detectors have been applied to automobile antilock brake systems (ABS) to determine rotational speed of automobile wheels. Proximity detectors have also been applied to automobile transmissions to determine rotating speed of transmission gears in order to shift the transmission at predetermined shift points and to perform other automobile system functions.

Magnetic field signals generated by the magnetic field sensing element during vibration can have characteristics that depend upon the nature of the vibration. For example, when used in an automobile transmission, during starting of the automobile engine, the proximity detector primarily tends to experience rotational vibration, which tends to generate magnetic field signals having a first wave shape. In contrast, during engine idle, the proximity detector primarily tends to experience translational vibration, which tends to generate magnetic field signals having a second wave shape. The magnetic field signals generated during a vibration can also change from time to time, or from application to application, e.g., from automobile model to automobile model.

It will be understood that many mechanical assemblies have size and position manufacturing tolerances. For example, when the proximity detector is used in an assembly, the air gap can have manufacturing tolerances that result in variation in magnetic field sensed by the magnetic field sensing elements used in the proximity detector when the ferrous object is rotating in normal operation and a corresponding variation in the magnetic field signal. It will also be understood that the air gap can change over time as wear occurs in the mechanical assembly.

Some conventional proximity detectors perform an automatic calibration to ensure proper operation in the presence of manufacturing tolerance variations described above. Calibration can be performed on the magnetic field signal in order to maintain an AC amplitude and a DC offset voltage within a desired range.

Many of the characteristics of a magnetic field signal generated in response to a vibration can be the same as or similar to characteristics of a magnetic field signal generated during rotation of the ferrous object in normal operation. For example, the frequency of a magnetic field signal generated during vibration can be the same as or similar to the frequency of a magnetic field signal generated during rotation in normal operation. As another example, the amplitude of a magnetic field signal generated in response to a vibration can be similar to the amplitude of a magnetic field signal generated during a rotation in normal operation. Therefore, the conventional proximity detector generates an output signal both in response to a vibration and in response to a rotation in normal operation. The output signal from the proximity detector can, therefore, appear the same, whether generated in response to a vibration or in response to a rotation in normal operation.

It may be adverse to the operation of a system, for example, an automobile system in which the proximity detector is used, for the system to interpret an output signal from the proximity detector to be associated with a rotation in normal operation when only a vibration is present. For example, an antilock brake system using a proximity detector to detect wheel rotation may interpret an output signal from the proximity detector to indicate a rotation of a wheel, when the output signal may be due only to a vibration. Therefore, the antilock brake system might not operate as intended.

It may also be undesirable to perform the above-described proximity detector calibration in response to a vibration rather than in response to a rotation in normal operation. Since the conventional proximity detector cannot distinguish a magnetic field signal generated in response to a rotation in normal operation from a magnetic field signal generated in response to a vibration, the proximity detector may perform calibrations at undesirable times when experiencing the vibration, and therefore, result in inaccurate calibration.

SUMMARY OF THE INVENTION

In accordance with the present invention, a proximity detector includes one or more magnetic field sensing elements adapted to provide one or more magnetic field signals indicative of a magnetic field associated with an object. The proximity detector further includes one or more state processors to provide a respective one or more state signals. Each of the state signals is indicative of a plurality of states associated with a respective one of the magnetic field signals. In some embodiments, the proximity detector further includes a vibration processor adapted to generate a vibration signal indicative of a vibration of at least one of the object and the one or more magnetic field sensing elements in response to state signals.

In accordance with another aspect of the present invention, a method of detecting an object includes generating one or more magnetic field signals indicative of a magnetic field associated with the object and generating one or more state signals. Each of the state signals is indicative of a plurality of states associated with a respective one of the magnetic field signals. In some embodiments, the method further includes generating a vibration signal indicative of a vibration of at least one of the object and the one or more magnetic field sensing elements in response to the state signals.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the present invention, some introductory concepts and terminology are explained. As used herein, the term "rotational vibration" refers to a back and forth rotation of an object about an axis of rotation, which object is adapted to rotate in a unidirectional manner about the axis of rotation in normal operation. As used herein, the term "translational vibration" refers to translation of the object and/or of magnetic field sensors used to detect magnetic fields generated by the object generally in a direction perpendicular to the axis of rotation. It should be recognized that both rotational vibration and translational vibration can cause signals to be generated by the magnetic field sensors.

Figure 1:
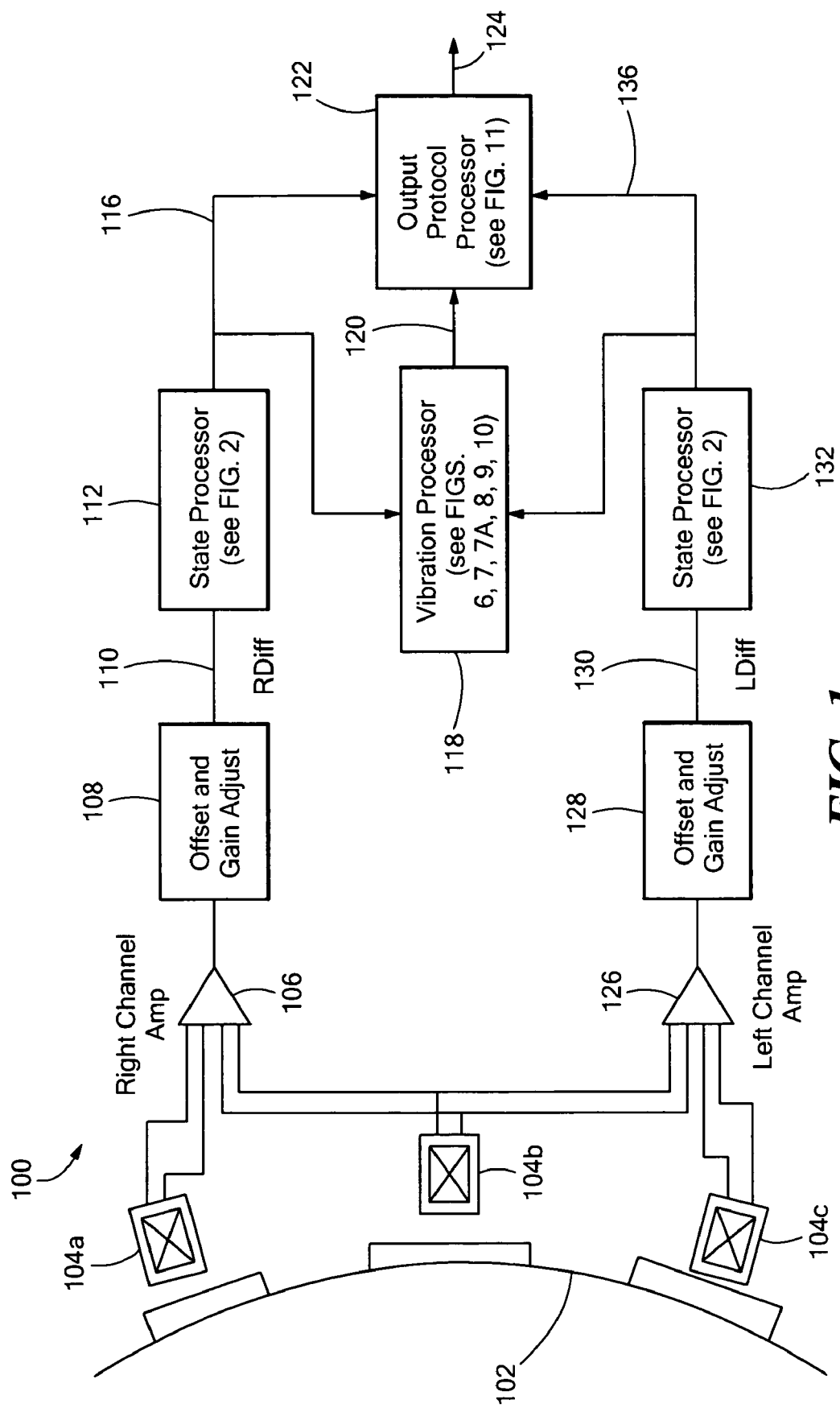
FIG. 1 is a block diagram showing a proximity detector having two state processors, a vibration processor, and an output protocol processor.

Referring to FIG. 1, an exemplary proximity detector system 100, includes three magnetic field sensing elements 104a-104c, each adapted to generate a respective magnetic-field-sensing-element signal in response to passing teeth of a rotating gear 102. The system 100 also includes a left channel amplifier 126 and a right channel amplifier 106. Offset and gain adjustment circuits 108, 128 remove unwanted DC offsets and provide equal adjustable gains to transform signals provided by the amplifiers 106, 126 into an RDiff signal 110 and an LDiff signal 130, each within a DC and AC operating range. The RDiff signal 110 and an LDiff signal 130 are referred to as "magnetic field signals" herein.

A first state processor 112 receives the RDiff signal 110 and provides a first state signal 116 indicative of a plurality of states associated with the RDiff signal 110. Similarly, a second state processor 132 receives the LDiff signal 130 and provides a second state signal 136 indicative of a plurality of states associated with the LDiff signal 130. The states are described more fully in conjunction with FIGS. 2, 2A, and 3 below.

A vibration processor 118 receives the state signals 116, 136 and provides a vibration signal 120 indicative of a vibration of one or more of the magnetic field sensing elements 104a-104c and/or of the gear 102. In some embodiments, the vibration processor 118 can include two or more vibration sub-processors (not shown) each of which can detect a vibration and each of which can contribute to the vibration signal 120. For example, each one can contribute one or more vibration bits, each indicative of a vibration. The vibration processor 118 is described more fully in conjunction with FIGS. 6-9.

An output protocol processor 122 receives the state signals 116, 136 and the vibration signal 120 and provides a rotation signal 124 indicative of a rotation of the gear 102 and also indicative of the vibration of one or more of the magnetic field sensing elements 104a-104c and/or of the gear 102. However, in some other embodiments, the vibration processor 118 is omitted, and the output protocol processor 122 provides the rotation signal 124 indicative of the rotation of the gear 102 and not indicative of the vibration of the magnetic field sensing elements 104a-104c or the gear 102.

In some embodiments, the rotation signal 124 is a single bit digital signal having a frequency related to the speed of rotation of the gear 102, and the rotation signal 124 is blanked (i.e., ceases to transition) when the vibration signal 120 indicates a vibration. However, in other embodiments, the rotation signal 124 can indicate aspects of the rotation of the gear 102 in other ways, and the above-described vibration can be represented in other ways.

Figure 2:
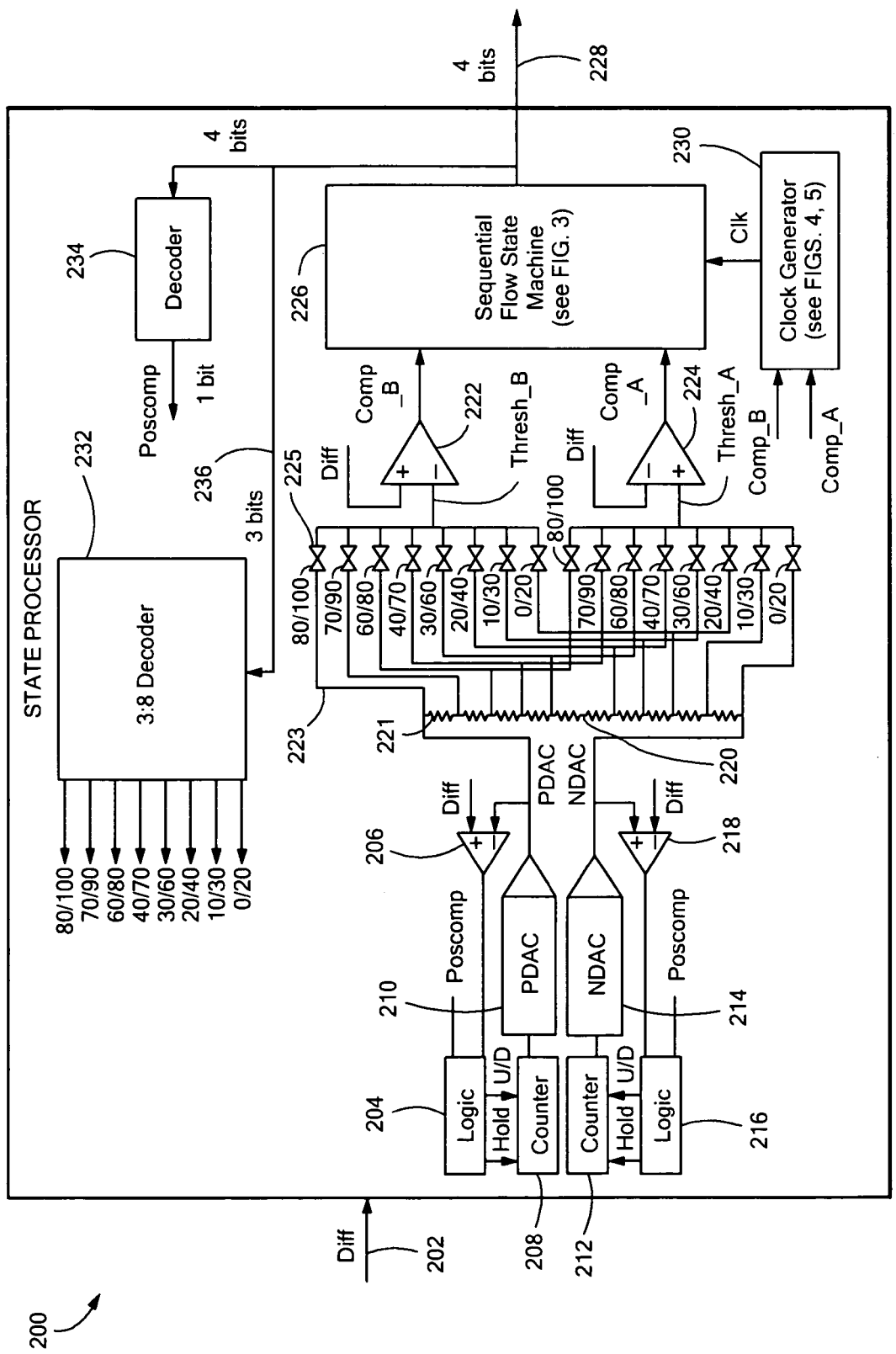
FIG. 2 is a block diagram showing further details of one of the two state processors of FIG. 1, including a sequential flow state machine and an associated clock generator.

Referring now to FIG. 2, a state processor 200 can be the same as or similar to each one of the state processors 112, 132 of FIG. 1. The state processor 200 receives a DIFF signal 202, which can be the RDiff signal 110 or the LDiff signal 130 of FIG. 1. The state processor 200 includes a first counter 206, which can hold or count up or count down, under the control of a first logic circuit 204. The first logic circuit 204 is responsive to a POSCOMP signal and to a comparator 208. The first counter 208 causes a PDAC (p-channel digital-to-analog converter) 210 to generate a PDAC signal, which tracks a positive peak of the DIFF signal 202.

Similarly, the state processor 200 includes a second counter 212, which can hold or count up or count down, under the control of a second logic circuit 216. The second logic circuit 216 is responsive to the POSCOMP signal and to a comparator 218. The second counter 212 causes an NDAC (n-channel digital-to-analog converter) 214 to generate an NDAC signal, which tracks a negative peak of the DIFF signal 202.

Generation of the PDAC signal and the NDAC signal is further described below in conjunction with FIG. 2A. However, let is suffice here to say that the PDAC signal and the NDAC signal are generally DC signals that track the peak-to-peak amplitude of the DIFF signal.

The state processor 200 also includes a resistor ladder 220 having a plurality of resistors, of which a resistor 221 is but one example, with a plurality of output taps, of which an output tap 223 is but one example, coupled to a plurality of transmission gates, of which a transmission gate 225 is but one example. It will be recognized that the output taps of the resistor ladder define a plurality of voltages proportional to the peak-to-peak amplitude of the DIFF signal. In one particular embodiment, the output taps correspond to percentages of the peak-to-peak amplitude of the DIFF signal, for example, 0, 10, 20, 30, 40, 60, 70, 80, 90, and 100 percent of the peak-to-peak amplitude of the DIFF signal.

The transmission gates, e.g., transmission gate 225, are controlled by respective control signals 0/20, 10/30, 20/40, 30/60, 40/70, 60/80, 70/90, and 80/100. The control signal identifications correspond to two percentages of the peak-to-peak amplitude of the DIFF signal. For example, the control signal 0/20 corresponds to zero percent and twenty percent of the peak-to-peak amplitude of the DIFF signal. Therefore, the two percentages, in this case zero and twenty, can correspond to a so-called "state" of the DIFF signal, wherein, at a particular point in time, if the DIFF signal is between zero and twenty percent of the peak-to-peak amplitude of the DIFF signal, then it is in a state zero (also referred to as state 000 herein). Similarly, if at a particular point in time, if the DIFF signal is between ten and thirty percent of the peak-to-peak amplitude of the DIFF signal, then it is in a state 1 (also referred to as state 001 herein). In one particular embodiment, there are eight states of the DIFF signal, according to the eight control signals 0/20, 10/30, 20/40, 30/60, 40/70, 60/80, 70/90, and 80/100.

A comparator 222 receives a threshold signal THRESH_B and also receives the DIFF signal. Comparator 222 generates a two-state COMP_B signal, which is high when the DIFF signal is above the THRESH_B signal. Similarly, a comparator 224 receives a threshold signal THRESH_A and also receives the DIFF signal. Comparator 224 generates a two-state COMP_A signal, which is high when the DIFF signal is below the THRESH_A signal.

It will be appreciated that, in combination, the comparators 222, 224 form a window comparator for which a DIFF signal outside of a window defined by the THRESH_A and THRESH_B signals results in a high state in one of the COMP_A and COMP_B signals. It will be further recognized that the THRESH_A and THRESH_B signals have respective voltages selected to be zero and twenty percent, ten and thirty percent, twenty and forty percent, thirty and sixty percent, forty and seventy percent, sixty and eighty percent, seventy and ninety percent, and eighty and one hundred percent of the range between the PDAC and NDAC signals according to the control voltages 0/20, 10/30, 20/40, 30/60, 40/70, 60/80, 70/90, and 80/100. Therefore, at any instant in time, the comparators 222 and 224 are able to identify in which of the eight states the DIFF signal resides.

A sequential flow state machine 226 receives the COMP_A and COMP_B signals. The sequential flow state machine 226 is described more fully below in conjunction with FIG. 3. However, the sequential flow state machine 226 decodes the state information associated with the COMP_A and COMP_B signals described above and provides a 4-bit output 228. The four bits include three bits indicative of the state and one bit indicative of the slope of the DIFF signal, positive or negative.

A 3:8 decoder 232 receives the three bits indicative of the state of the DIFF signal and provides the control signals, 0/20, 10/30, 20/40, 30/60, 40/70, 60/80, 70/90, and 80/100, which control the transmission gates, e.g., the transmission gate 225.

A decoder 234 receives the four bits indicative of state and slope of the DIFF signal and generates the POSCOMP signal.

A clock generator circuit 230 provides a clock signal, CLK, to clock the sequential flow state machine. The clock generator circuit 230 is described in more detail in conjunction with FIGS. 4 and 5.

Figure 2A:
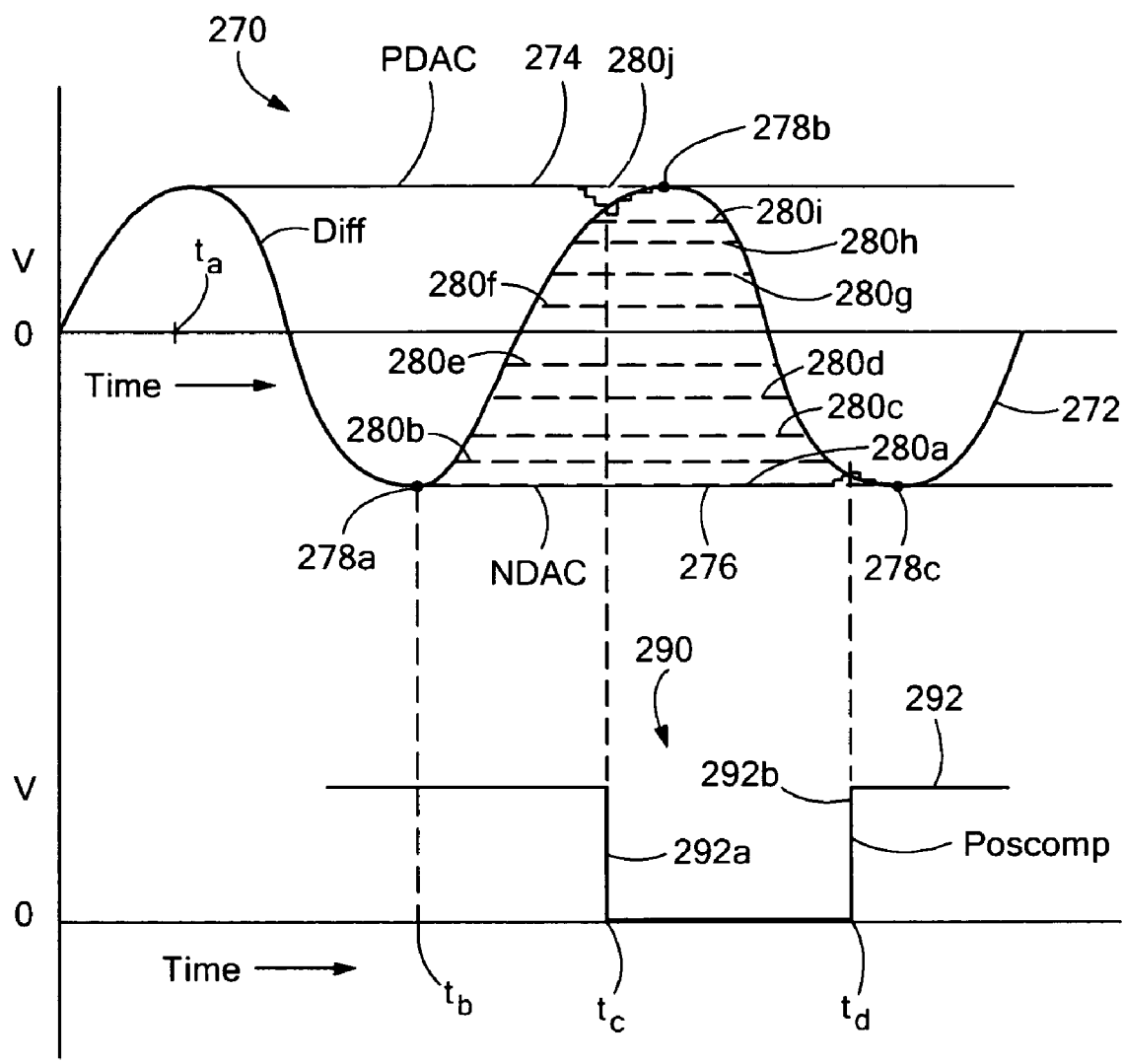
FIG. 2A is a graph used to describe operation of the sequential flow state machine of FIG. 2.

Referring now to FIG. 2A, graphs 270, 290 each have vertical scales in units of volts and horizontal scales in units of time. A DIFF signal 272 can correspond, for example, to the RDiff signal 110 of FIG. 1 or to the LDiff signal 130 of FIG. 1. A POSCOMP signal 292 can correspond, for example to the POSCOMP signal of FIG. 2.

The DIFF signal 272 is shown to have a shape of a simple sine wave for clarity. However, it will be recognized that the DIFF signal 272 can have various shapes.

Points 278a, 278c correspond to negative peaks of the DIFF signal 272. A point 278b corresponds to a positive peak of the DIFF signal 272. Voltage levels (i.e., thresholds) 280a-280j each correspond to percentages of the peak-to-peak amplitude of the DIFF signal 272. For example, the threshold 280a corresponds to zero percent and the threshold 280b corresponds to ten percent.

The above-described states of the DIFF signal 272 can be associated with the thresholds 280a-280j. For example, the DIFF signal is in the state zero when it is between the zero percent threshold 280a and the twenty percent threshold 280c. The DIFF signal is in the state 1 (or 001) when the DIFF signal 272 is between the ten percent threshold 280b and the thirty percent threshold 280d.

Therefore, it will be appreciated that each state corresponds to two of the thresholds 280a-280j. There are ten threshold (0, 10, 20, 30, 40, 60, 70, 80, 90, and 100 percent) and eight states (0/20, 10/30, 20/40, 30/60, 40/70, 60/80, 70/90, and 80/100), respectively. While the percentages assigned to the states described above are separated by particular percentages, other percentage separations can also be used. While ten thresholds are used to define eight states above, in other embodiments, a number of thresholds greater than or less than ten can be used to define a number of states greater than or less than eight.

A PDAC signal 274 corresponds to the PDAC signal of FIG. 2 and an NDAC signal 276 corresponds to the NDAC signal of FIG. 2. As seen in FIG. 2, the PDAC and NDAC signals are applied to the resistor ladder 220, which can provide outputs at a variety of percentages of a difference between the PDAC signal and the NDAC signal.

Presuming steady state conditions, at a time ta, the PDAC signal 274 is at a steady state relatively high level corresponding to a positive peak of the DIFF signal 272, where it remains until a time tc, associated with an edge 292a of the POSCOMP signal 292. At the time tc, the PDAC signal 274 counts down until the PDAC signal 274 intersects the DIFF signal 272, at which point, the PDAC signal 274 reverses direction and counts up to track the DIFF signal 272 to its next positive peak at the point 278b. Upon reaching the point 278b, the PDAC signal 274 again holds its value at the positive peak of the DIFF signal 272.

At a time tb, the NDAC signal 276 is at a steady state relatively low level corresponding to a negative peak of the DIFF signal 272, where it remains until a time td associated with an edge 292b of the POSCOMP signal 292. At the time td, the NDAC signal 276 counts up until the NDAC signal 276 intersects the DIFF signal 272, at which point, the NDAC signal 276 reverses direction and counts down to track the DIFF signal 272 to its next negative peak at the point 278c. Upon reaching the point 278c, the NDAC signal 276 again holds its value at the negative peak of the DIFF signal 272. The above-described behavior of the PDAC signal 274 and the NDAC signal 276 repeats on each cycle of the DIFF signal 272.

Referring again briefly to FIG. 2, the POSCOMP signal is generated by decoding states (and slopes) provided by the sequential flow state machine 226. It will be apparent that the POSCOMP signal can be generated to have one of a finite set of phases relative to the DIFF signal. Referring again to FIG. 2A, it is desirable to generate the POSCOMP signal 292 to have a phase offset from the phase of the DIFF signal 272, therefore allowing the PDAC and NDAC signals 274, 276 to step first in one direction and then in the other. This arrangement allows the PDAC and NDAC signals 274, 276 to be able to track the DIFF signal 272 when the DIFF signal decreases in peak-to-peak amplitude.

Figure 3:
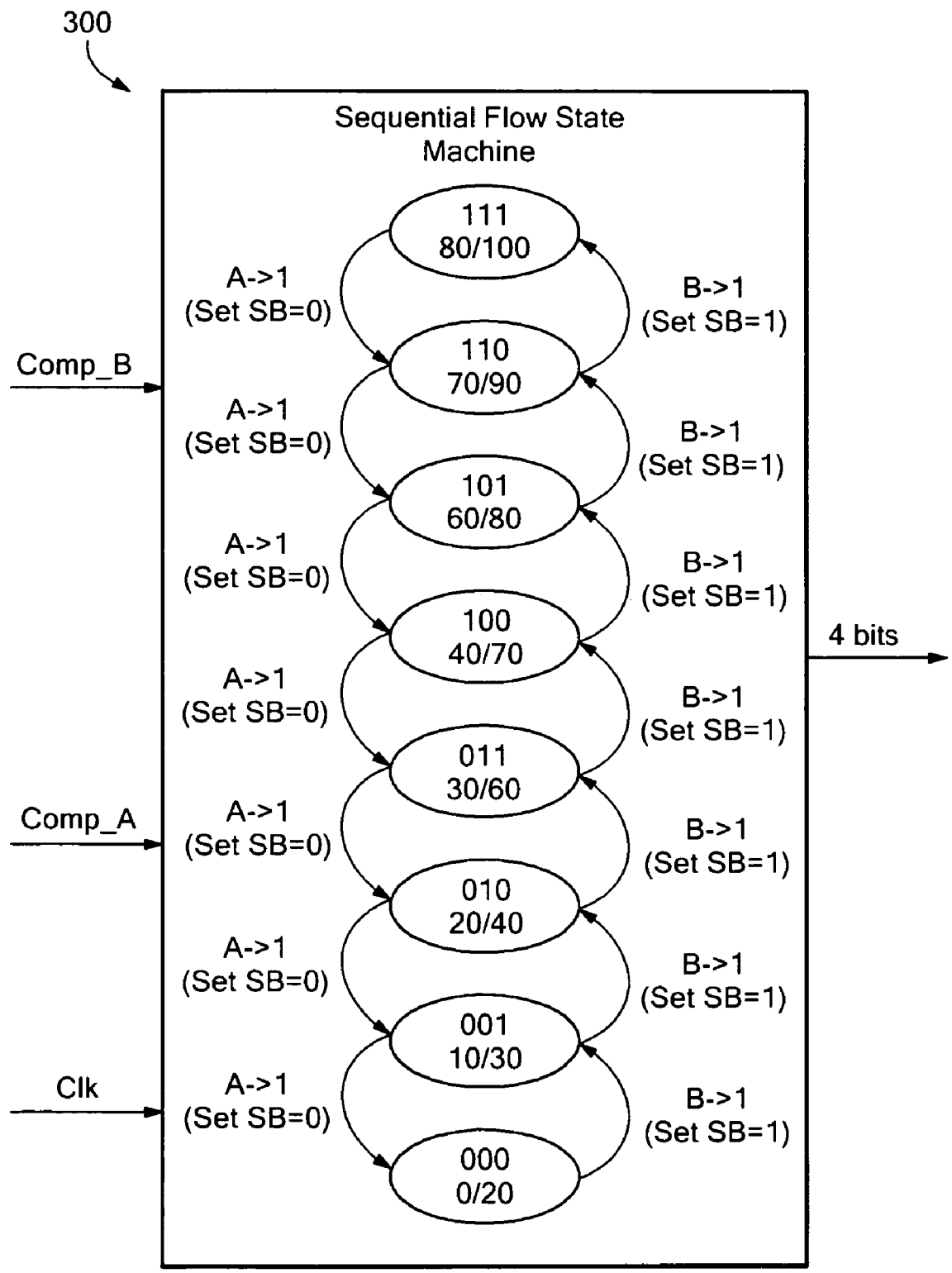
FIG. 3 is a state diagram showing operation of the state processor of FIG. 2.

Referring now to FIG. 3, a sequential flow state machine 300 is the same as or similar to the sequential flow state machine 226 of FIG. 2. States of the sequential flow state machine 300 are represented by ovals, each corresponding to a state. Those of ordinary skill in the art will understand how to implement the sequential flow state machine 300 in hardware, for example, using flip-flops. Each oval corresponds to one of the above-described eight states of the DIFF signal of FIGS. 2 and 2A. Within each oval, a binary number represents a corresponding state. Within each oval, two numbers separated by a slash mark are indicative of the percentages of the peak-to-peak voltage of the DIFF signal according to the THRESH_A and THRESH_B signals of FIG. 2, which are representative of the indicated state. For example, 10/30, represents a THRESH_A signal set to be ten percent of the peak-to-peak voltage of the DIFF signal and a THRESH_B signal set to be thirty percent of the peak-to-peak voltage of the DIFF signal, associated with state 001. Therefore, when in state 001 (also referred to herein as state one) at a particular instant in time, the DIFF signal is between ten and thirty percent of its peak to peak voltage.

When the COMP_B signal (FIG. 2) transitions to a high level (i.e., B→1), indicating that the DIFF signal (FIG. 2) has moved upward from the window set by the window comparator (comparators 222, 224, FIG. 2), then a state transition occurs in an upward direction, for example, from state 001 to state 010. Conversely, when the COMP_A signal (FIG. 2) transitions to a high level (i.e., A→1), indicating that the DIFF signal (FIG. 2) has moved downward from the window set by the window comparator (comparators 222, 224, FIG. 2), then a state transition occurs in a downward direction, for example, from state 001 to state 000. When the state transition occurs in either direction, by way of the 3:8 decoder of FIG. 2, the THRESH_A and THRESH_B signals (FIG. 2) are set to values associated with the new state by way of the transmission gates, e.g., transmission gate 225, causing the window comparator to again surround the DIFF signal, and therefore, causing the COMP_B and COMP_A signals to again go low (A and B→0). With the above arrangement, the COMP_B and COMP_A signals identify when a state transition of the DIFF signal occurs, and in what direction it occurs.

It will be understood that each of the eight states of the DIFF signal is identified by three bits. A forth bit, a slope bit (SB) can be generated merely by setting the bit to a one whenever the COMP_B signal transitions to a high state (B→1) and setting the bit to a zero whenever the COMP_A signal transitions to a high state (A→1). Therefore, the sequential flow state machine provides an output having four bits, three of which identify a state of the DIFF signal, and a fourth bit (SB) that identifies whether the DIFF signal is traversing upward or downward in voltage. As used herein, the term state signal refers to all four bits or to only the three bits indicating the state.

As described above, the sequential flow state machine 300 can be one of two sequential flow state machines, each associated with a respective state processor 112, 132 of FIG. 1. Therefore, there can be two four-bit state signals, and two slope bits ($SB_L$ and $SB_R$), one associated with the LDiff signal and one associated with the RDiff signal.

The sequential flow state machine receives a clock signal (CLK) to which the state transitions are synchronized. In some embodiments, the CLK signal can be free running and asynchronous from other operations of the proximity detector 100 (FIG. 1). However, in other embodiments, the CLK signal is synchronous with transitions of the COMP_B signal and transitions of the COMP_A signal. Generation of the CLK signal is described more fully below in conjunction with FIG. 4

Figure 4:
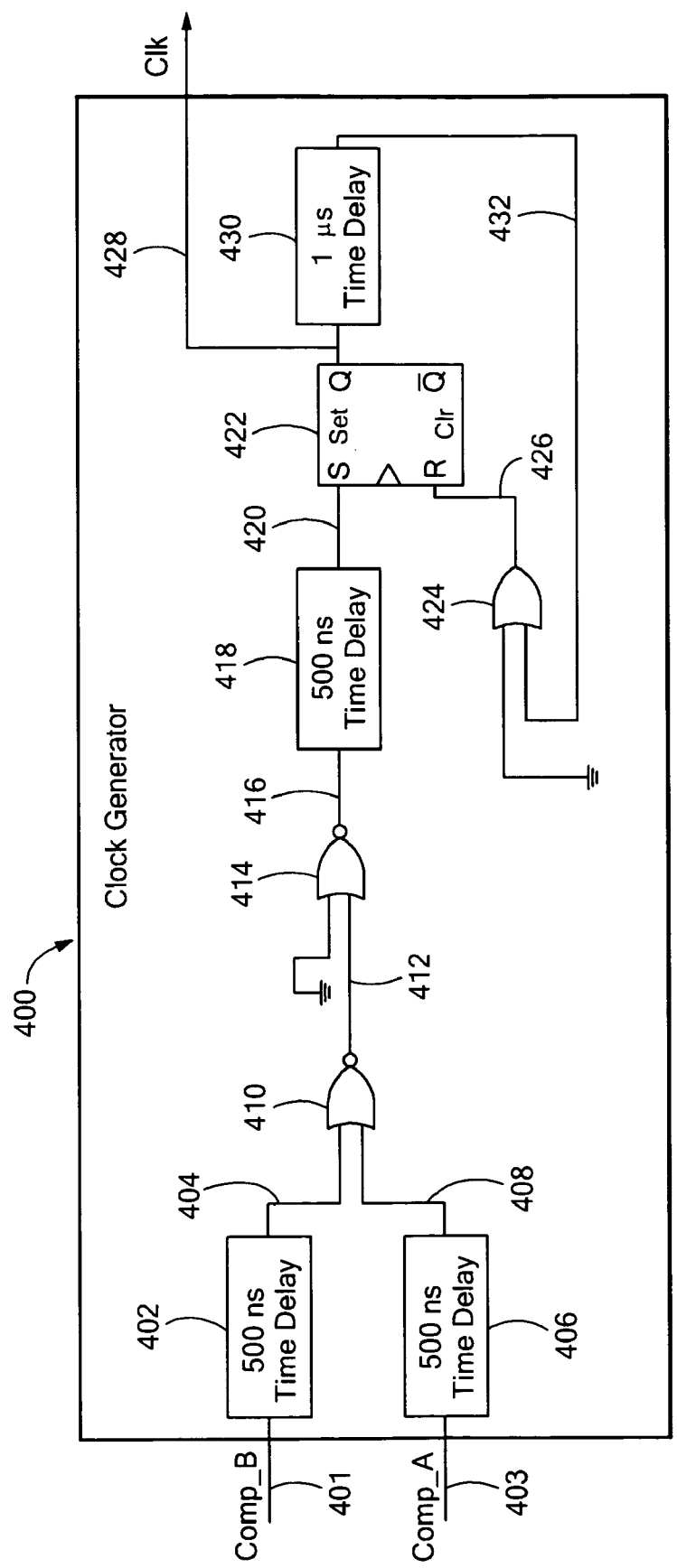
FIG. 4 is a block diagram showing further details of the clock generator of FIG. 2.

Referring now to FIG. 4, a clock generator 400 can be the same as or similar to the clock generator 230 of FIG. 2 and can provide the CLK signal shown in FIGS. 2 and 3. The clock generator receives the COMP_B signal and the COMP_A signals, which are the same as those signals shown in FIGS. 2 and 3. A 500 ns time delay module 402 delays the COMP_B signal and another 500 ns time delay module 406 delays the COMP_A signal to provide delayed signals 404, 408. A first NOR gate 410 generates a first NOR gate output signal 412. It will be recognized that the first NOR gate output signal 412 experiences a transition upon either of the COMP_A or COMP_B signal going high. A second NOR gate 414 generates a second NOR gate output signal 416. Yet another 500 ns time delay module 418 delays the second NOR gate output signal 412 to provide another time delayed signal 420. A set-reset flip-flop 422 receives the time-delayed signal 420 at a set input (S) and provides the clock signal, CLK, 428. Yet another time delay module 430 delays the CLK signal 428 by approximately 1 μs to provide another time delayed signal 432, which, via an OR gate 424 operating merely as a buffer, provides an OR gate output signal 426. The OR gate output signal 426 is received at a reset input (R) of the flip-flop 422.

In operation, the flip-flop 422 generates rising edges of the CLK signal 428 in response to rising edges received at the set input (S). The flip-flop 422 generates falling edges of the CLK signal 428 in response to rising edges received at the reset input (R). It will be apparent that the CLK signal 428 transitions high at some time after either one of the COMP_A or COMP_B signal transitions high and the CLK signal transition low approximately 1 μs thereafter. Operations of the various signals of the clock generator 400 are described more fully below in conjunction with FIG. 5.

Figure 5:
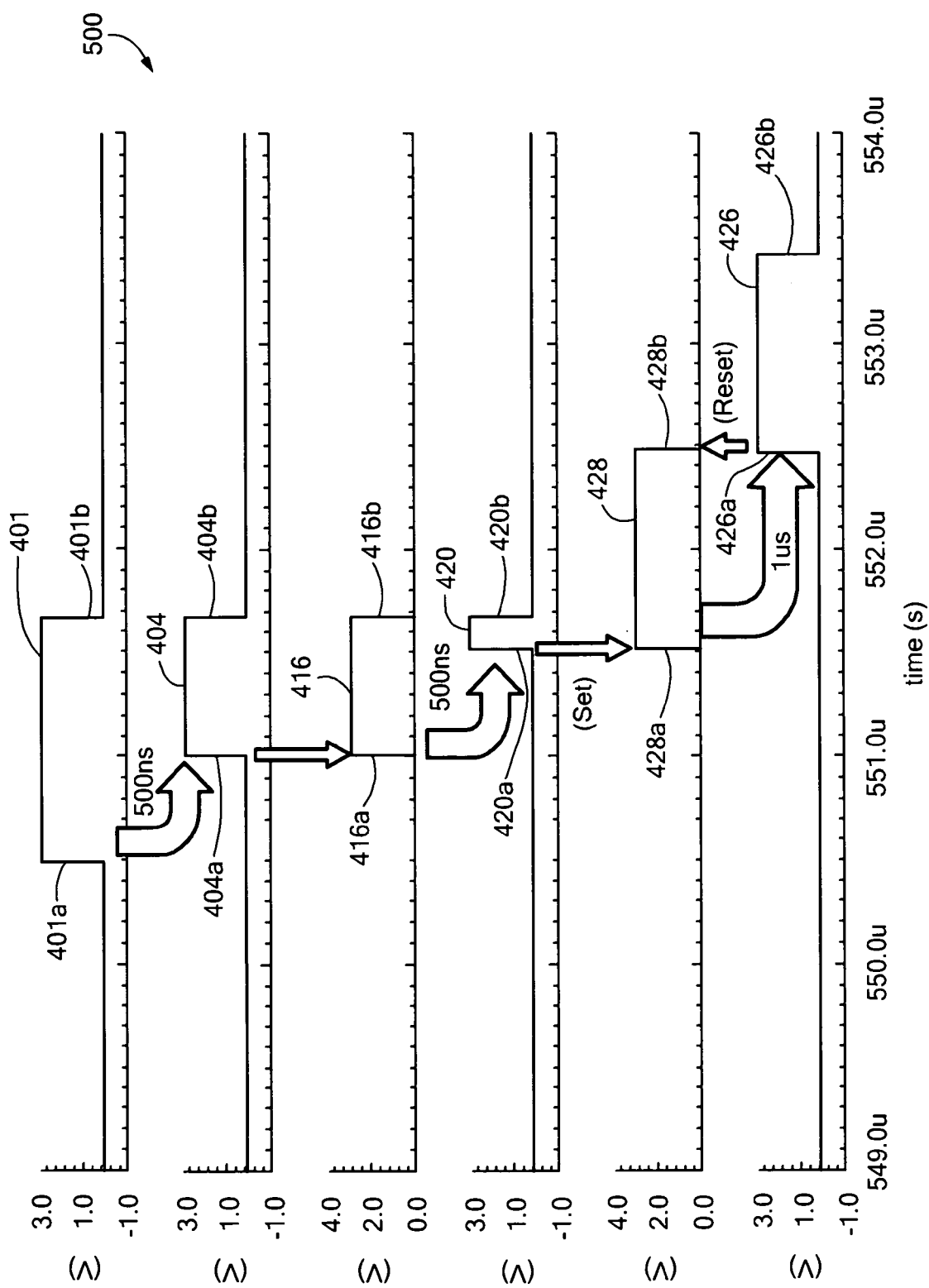
FIG. 5 is a series of graphs showing waveforms associated with the clock generator of FIG. 4.

Referring now to FIG. 5, in which like elements of FIG. 4 are shown having like reference designations, a diagram 500 has vertical axes in unit of volts and horizontal axes in units of time. The signal 401 has an edge 401a corresponding to a transition of the COMP_B signal 401 of FIG. 4, and is indicative of the DIFF signal having transitioned upward out of a voltage window established by the window comparator formed by comparators 222 and 224 of FIG. 2. The time-delayed signal 404 has an edge 404a delayed from the edge 401a by approximately 500 ns. The second NOR gate output signal 416 has an edge 416a that essentially aligns with the edge 404a. The time-delayed signal 420 has an edge 420a delayed from the edge 416a by approximately 500 ns. The CLK signal 428 has an edge 428a that essentially aligns with the edge 420a. The OR gate output signal 426 has an edge 426a delayed from the edge 428a by approximately 1 μs. The edge 426a resets the flip-flop 422 of FIG. 4, resulting in edge 428b of the CLK signal 428.

It will be appreciated that the edge 428a of the CLK signal 428 generates a change in the THRESH_A and THRESH_B signals (FIG. 2) associated with the window comparator (comparators 222, 224, FIG. 2). Therefore, the edge 428a generally aligns with the edge 401b of the COMP_B signal 401.

With the above arrangement, edges of the CLK signal 428 are delayed from transitions of the COMP_B signal 401, resulting in elimination of race conditions and possible chatter.

Figure 10:
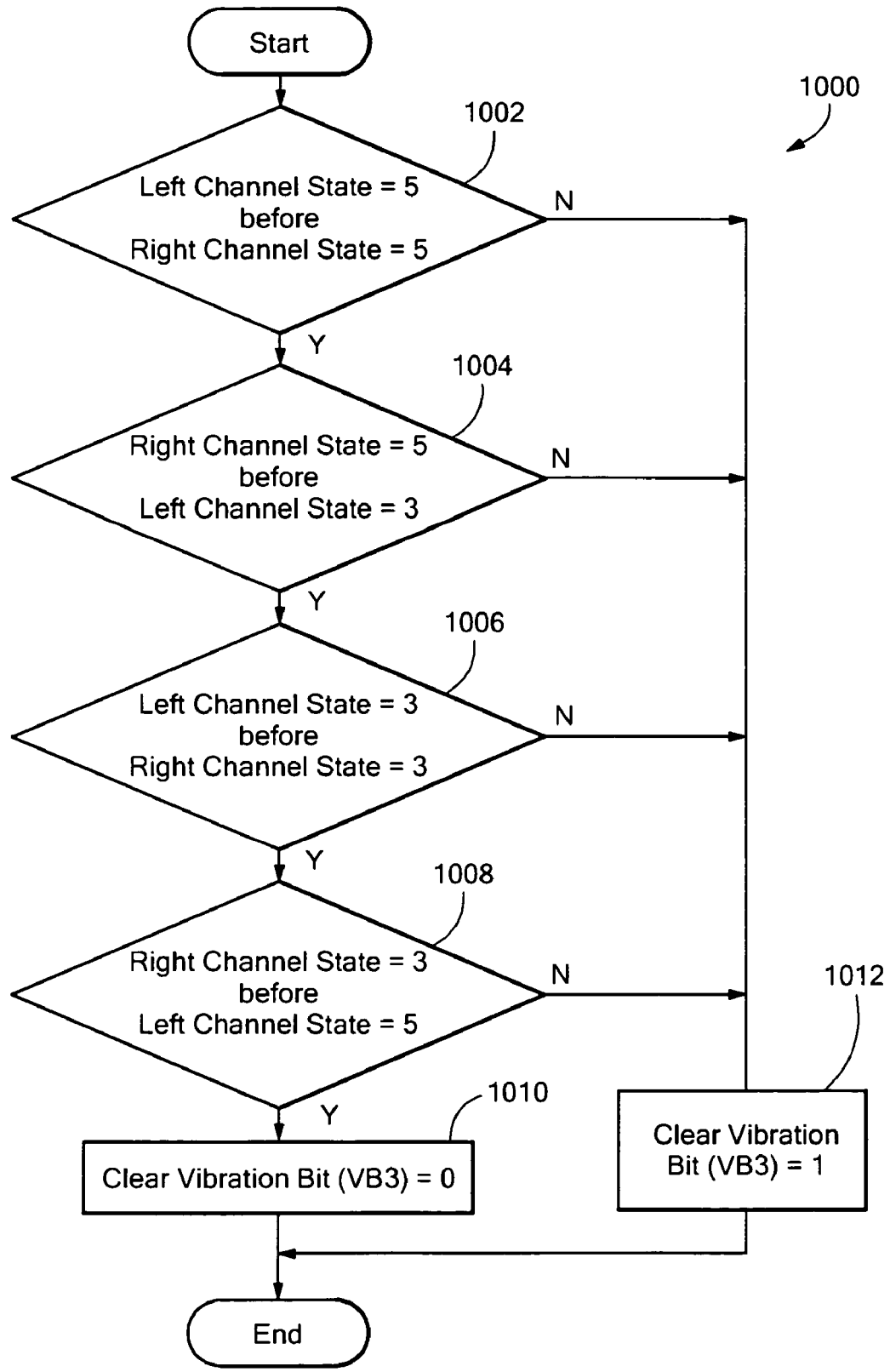
FIG. 10 is a flow chart showing another vibration detection process that can be used in conjunction with the vibration processor of FIG. 1.
Figure 11:
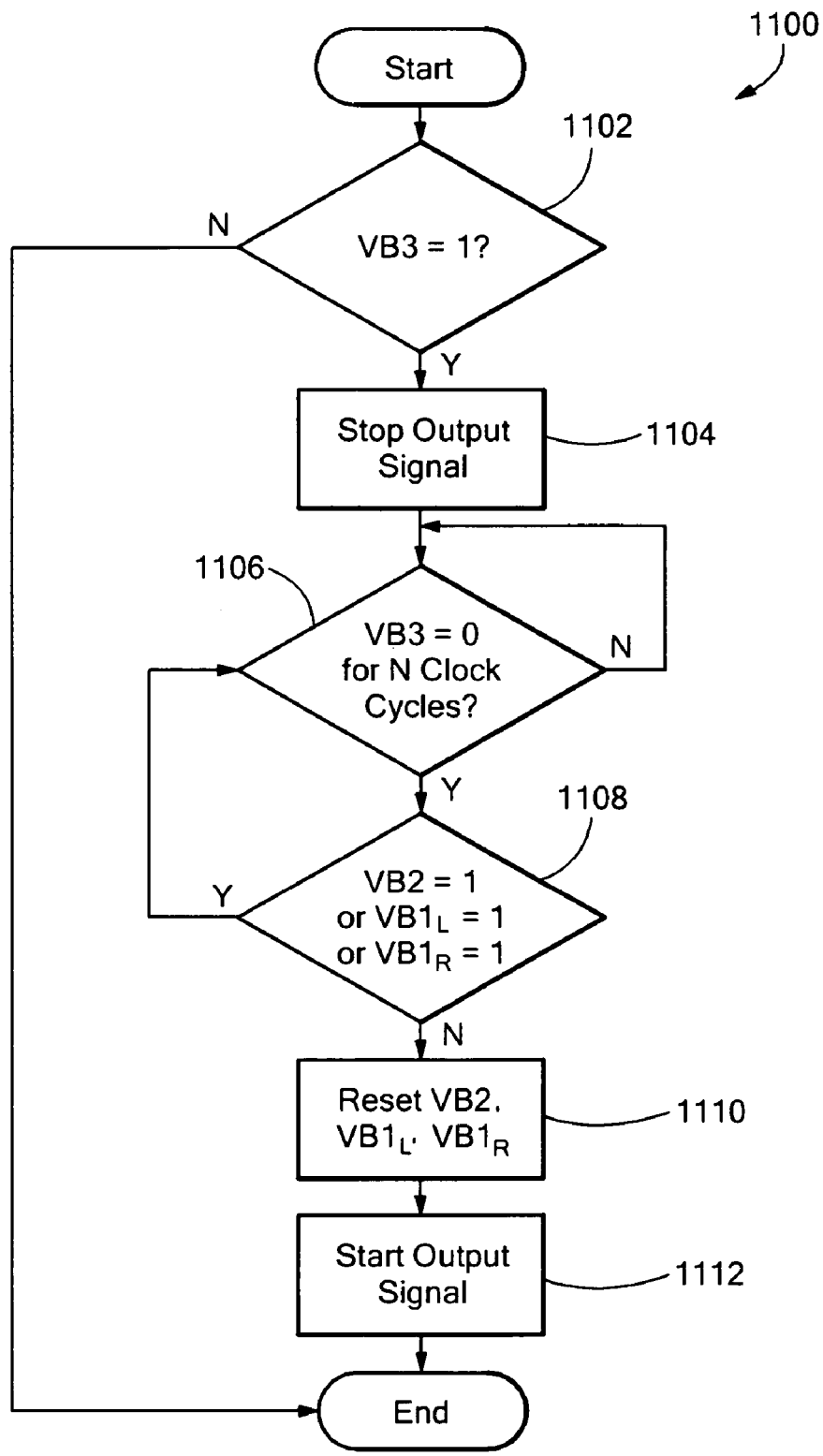
FIG. 11 is a flow chart showing a process associated with the output protocol processor of FIG. 1.

It should be appreciated that FIGS. 6-7A and 10 show flowcharts illustrating a technique, which would be implemented in the vibration processor 118 (FIG. 1) and FIG. 11 shows a flowchart illustrating a technique, which would be implemented in the output protocol processor 122 (FIG. 1). The rectangular elements (typified by element 604 in FIG. 6), herein denoted "processing blocks," represent computer software instructions or groups of instructions. The diamond shaped elements (typified by element 601 in FIG. 6), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Figure 6:
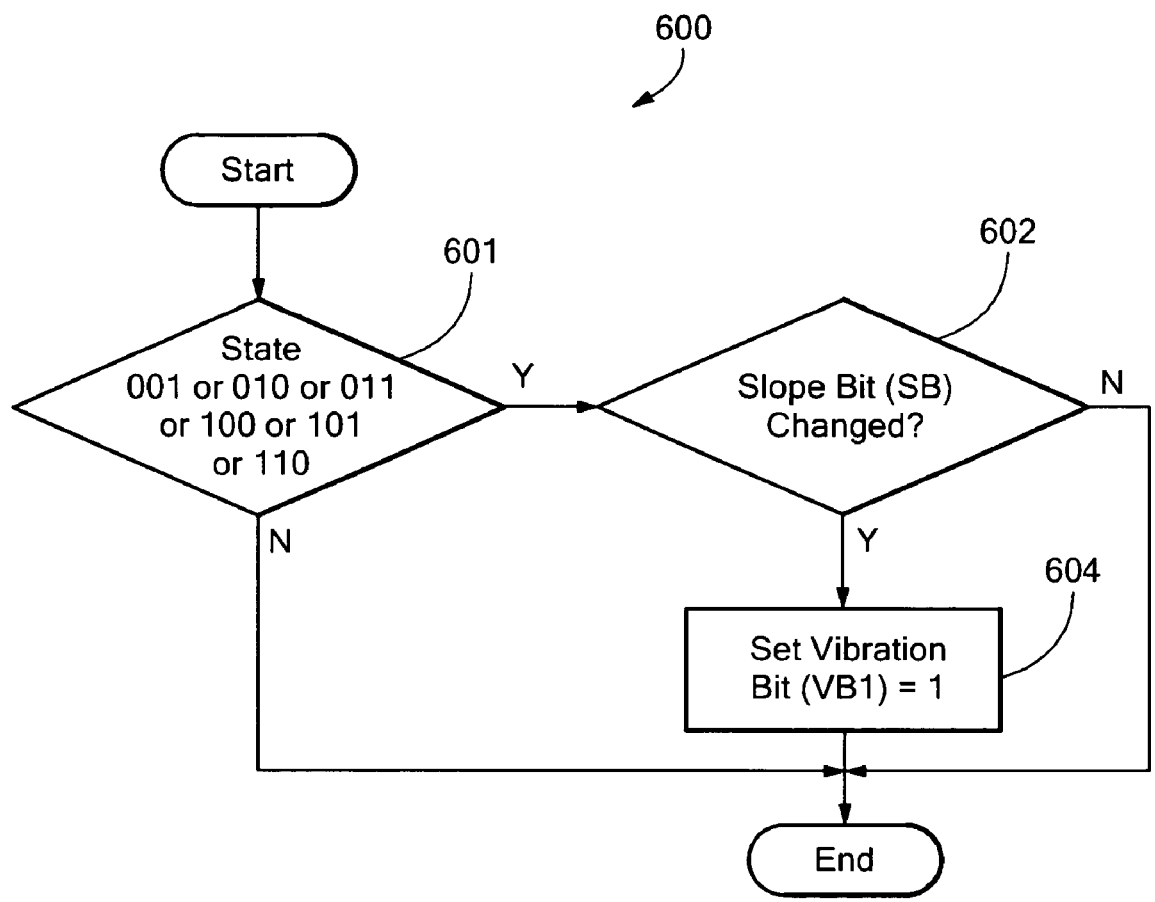
FIG. 6 is a flow chart showing a vibration detection process that can be used in conjunction with the vibration processor of FIG. 1.
Figure 7:
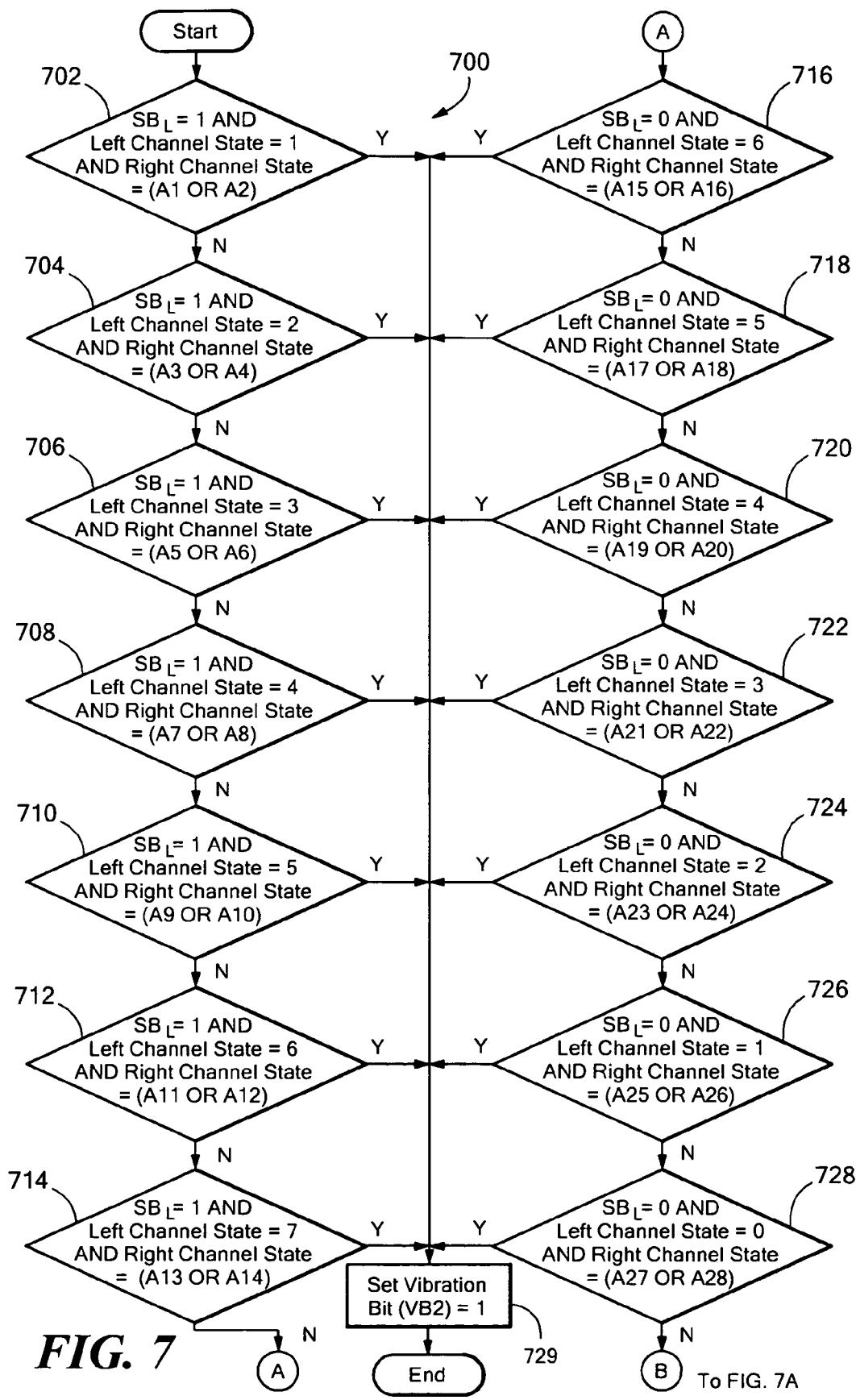
FIGS. 7-7A are a flow chart showing another vibration detection process that can be used in conjunction with the vibration processor of FIG. 1.
Figure 7A:
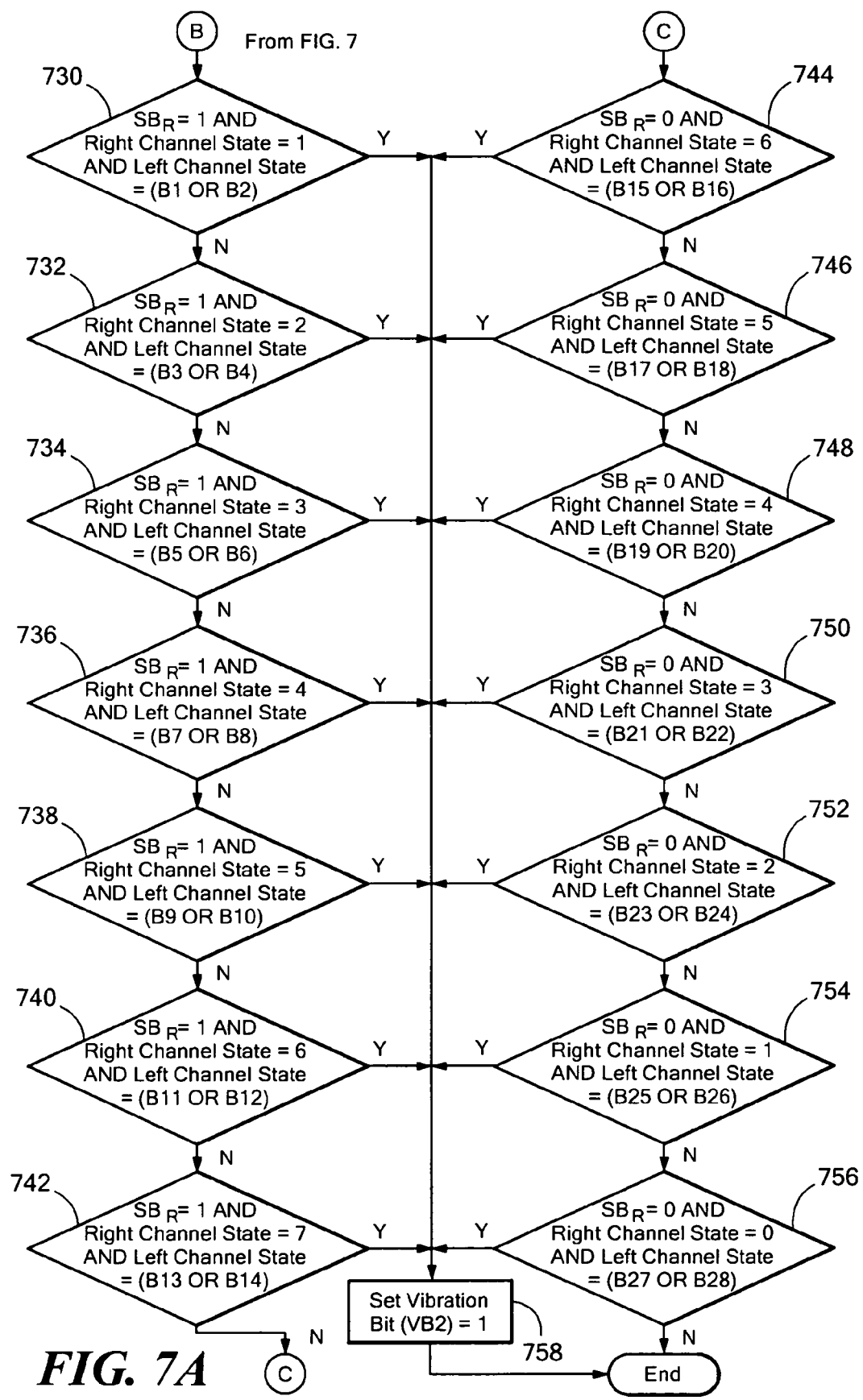

In FIGS. 6, 7, and 7A below, the state notation is decimal 0-7 rather than binary 000-111 used above.

Referring now to FIG. 6, a process 600 can be used to detect a vibration in an object that rotates in normal operation, for example, the gear 102 of FIG. 1. It will be understood that the process 600 applies to but one state transition of the DIFF signal, and process 600 can be performed on each positive or negative edge of the CLK signal of FIGS. 2-5. Furthermore, there are two DIFF signals, RDiff and LDiff 110, 130, respectively, as shown in FIG. 1, and the process 600 can be performed for both the RDiff and the LDiff signals 110, 130. Therefore, the process 600 can generate two vibration bits ($VB1_L$, $VB1_R$), a vibration bit (VB1) for each channel.

The process 600 begins at decision block 601, arrived at upon a state transition as described above. If the state is state 1-6 (i.e., the state is not 0 or 7) then the process proceeds to decision block 602. If at decision block 602, the slope bit (SB) (FIG. 3) changed during the state transition, then the process continues to block 604, where a vibration bit (VB1) is set, which is indicative of a vibration.

If at decision block 601, the current state is none of states 1-6 (i.e., the state is 0 or 7) then the process ends. If at decision block 602, the slope bit did not change to arrive at the current state, then the process ends.

By inspection of the states of FIG. 3, it should be apparent that the slope bit (SB) should not have changed to arrive at any of states 1-6. The vibration bit being set is indicative of a vibration. The vibration bit being set, in some applications, can also be indicative of a direction change, i.e., a change in the direction of rotation of the gear 102 of FIG. 1.

Subsequent processing (FIG. 11) can make use of the vibration bit (VB1) provided by the process 600 to determine whether a vibration or a change in direction of rotation has occurred. Subsequent processing (FIG. 11) can also reset the vibration bit (VB1), for example, if the determination indicates a change in direction of rotation of the gear 102, rather than a vibration.

It should be understood that the process 600 can be repeated on each clock cycle of the CLK signal (FIGS. 2-5). However, in an alternate arrangement, the process 600 is repeated at another rate, for example, on each third cycle of the CLK signal, or at a rate asynchronous from the CLK signal.

Referring now to FIGS. 7 and 7A, another process 700 can be used alone or in combination with the process 600 of FIG. 6 to identify a vibration. The process 700 begins at decision block 702, where if the slope bit ($SB_L$) associated with the LDiff signal (FIG. 1) is one (i.e., the LDiff signal is rising) and the left channel state is one (i.e., the state of the LDiff signal is one), and the right channel state is either A1 or A2 (i.e., the state of the RDiff signal is A1 or A2), then the process proceeds to block 729.

At block 729, a second vibration bit, VB2 is set, which is indicative of a vibration of at least one of the gear 102 (FIG. 1) and the magnetic field sensors 104a-104c (FIG. 1).

Similarly, decision blocks 704-714 test conditions of the RDiff signal associated with states 2-7 of the LDiff signal for a rising LDiff signal (slope bit ($SB_L$)=1).

Decisions blocks 716-728 test conditions of the RDiff signal associated with states 6-0 of the LDiff signal for a falling LDiff signal (slope bit ($SB_L$)=0).

It should be appreciated that decision blocks 702-728 consider the LDiff signal to be a primary signal, the state of which is compared to the state of the associated RDiff signal. Decision blocks 730-756 take the other approach, considering the RDiff signal to be a primary signal, the state of which is compared to the state of the associated LDiff signal.

At decision block 730, if the slope bit (SBR) associated with the RDiff signal (FIG. 1) is one (i.e., the RDiff signal is rising) and the right channel state is one (i.e., the state of the RDiff signal is one), and the left channel state is either B1 or B2 (i.e., the state of the LDiff signal is B1 or B2), then the process proceeds to block 758, where the vibration bit (VB3) is set as in block 729.

Similarly, decision blocks 732-742 test conditions of the LDiff signal associated with states 2-7 of the RDiff signal for a rising RDiff signal (slope bit ($SB_R$)=1).

The states A1-A28 and B1-B28 can be any of the states zero to seven, in any combination. Also, some or all of the states A1-A28 and B1-B28 can be the same state. In essence, A1-A28 and B1-B28 are members of sets or vectors of states having 28 state values.

Decisions blocks 744-756 test conditions of the LDiff signal associated with states 6-0 of the RDiff signal for a falling RDiff signal (slope bit ($SB_R$)=0).

If the conditions of any of the decision blocks 702-756 are met, then the process sets the vibration bit (VB2) at either block 729 or at block 758, i.e., the vibration bit (VB2) is set to one.

If none of the conditions of any of the decision blocks 702-756 are met, then the process ends.

In some embodiments, the vibration bit (VB2) of FIG. 7 is a different vibration bit than the one or two vibration bits ($VB1_L$, $VB1_R$) described in conjunction with FIG. 6. However, in other embodiments, the vibration bits generated by the process 600 of FIG. 6 and by the process 700 of FIGS. 7 and 7A are combined to provide one vibration bit (VB).

Subsequent processing (FIG. 11) can make use of the vibration bit (VB2) provided by the process 700 to determine whether a vibration or a change in direction of rotation has occurred. Subsequent processing (FIG. 1) can also reset the vibration bit (VB2), for example, if the determination indicates a change in direction of rotation of the gear 102, rather than a vibration.

It should be understood that the process 700 can be repeated on each clock cycle of the CLK signal (FIGS. 2-5). However, in an alternate arrangement, the process 700 is repeated at another rate, for example, on each third cycle of the CLK signal, or at a rate asynchronous from the CLK signal.

It should also be understood that the RDiff signal 110 and the LDiff signal 130 of FIG. 1 can be at a particular phase relationship (for example, ninety degrees) when the gear 102 is rotating in normal operation, and at a different phase relationship (for example, zero degrees or one hundred eighty degrees) when the gear 102 and/or the magnetic field sensors 104a-104c are experiencing a vibration. It should be further understood that the state comparisons between the right and left channels of FIGS. 7 and 7A are indicative of a relative phase between the RDiff signal 110 and the LDiff signal 130. For example, the states A1-A28 and B1-B28 can be indicative of a phase relationship of zero degrees and one hundred eight degrees between the left and right channels, which can be indicative of a vibration.

While two of states A1-A28 and B1-B28 are associated with each decision block 702-756, in other embodiments there can be more than two or fewer than two states associated with one or more of the decision blocks 702-756. In other words, taking decision block 702 as an example, instead of the condition right channel state equals A1 or A2, the condition can be right channel state equals A1 or A2 or A3 or A4.

In some embodiments, the process 700 includes fewer decision blocks. For example, in some embodiments, decision blocks 730-756 are eliminated, and the process 700 uses only one channel as a primary channel.

Figure 8:
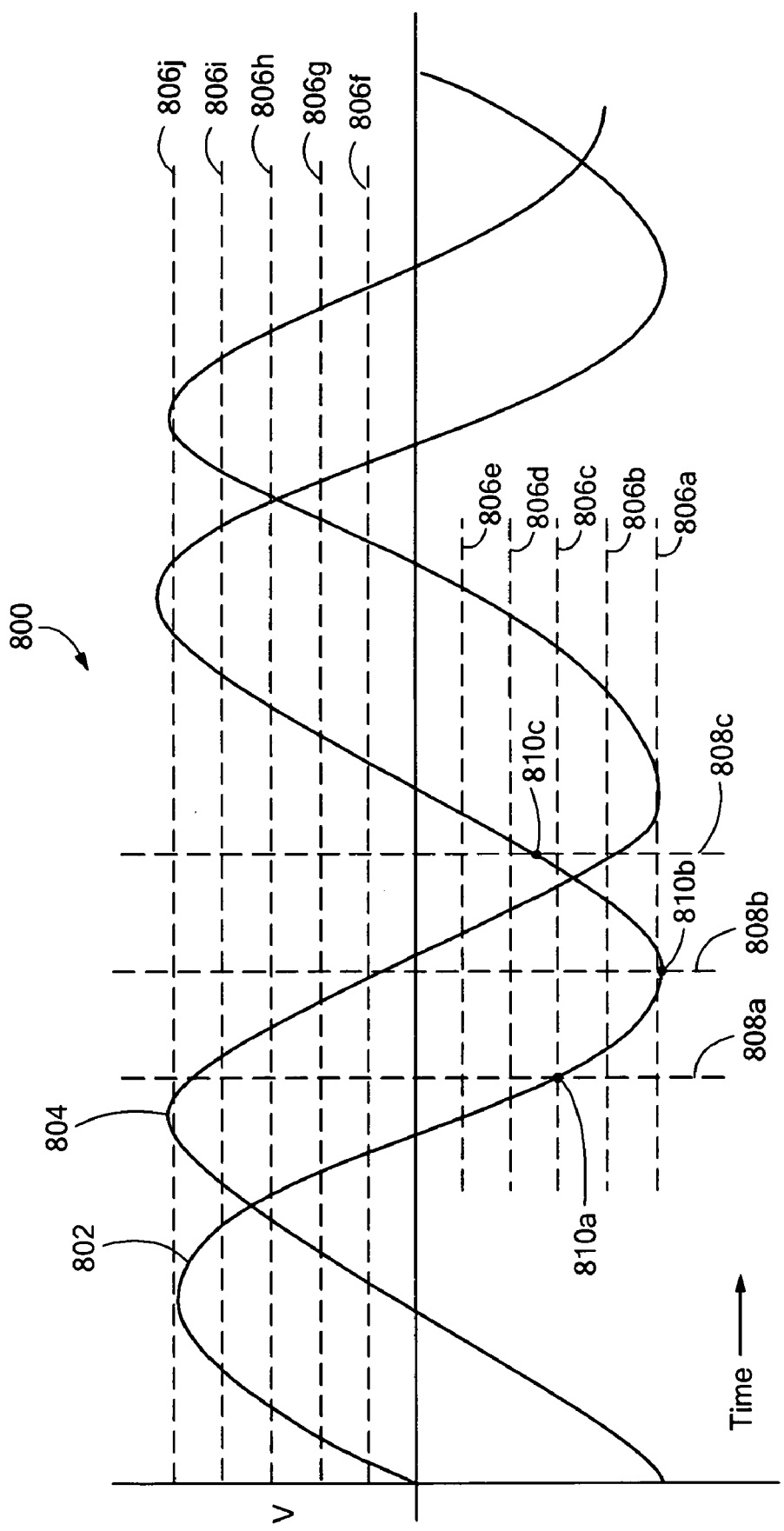
FIG. 8 is a graph showing waveforms used to describe operation of the vibration detection process of FIGS. 7-7A.

Referring now to FIG. 8, a graph 800 has a horizontal scale in units of time and a vertical scale in units of voltage. A curve 802 corresponds to an LDiff signal, for example the LDiff signal of FIG. 1. A curve 804 corresponds to an RDiff signal, for example the RDiff signal of FIG. 1.

The LDiff and RDiff signals 802,804, respectively, are shown to be approximately ninety degrees out of phase, however, the phase difference can be less than or greater than ninety degrees. Eight states are shown according to dashed lines 806a-806j. Taking the LDiff signal 802 as representative also of the RDiff signal 804, a state zero of the LDiff signal 802 is achieved when the LDiff signal 802 falls between the dashed lines 806a and 806c. A state one is achieved when the LDiff signal 802 falls between the dashed lines 806b and 806d, and so forth.

It can be seen that, in normal operation, in the absence of a direction change or a vibration, when the LDiff signal 802 is in the zero state and has a negative slope, (between dashed lines 806a and 806b, i.e., between points 810a and 810b) the RDiff signal 804 is in a different state, for example, any of the seventh state to the fourth state (see decision block 728, FIG. 7). Other examples can be found associated with each of the decision blocks 702-756 of FIGS. 7-7A.

Using the above example, referring again to FIG. 7, at decision block 728, when the LDiff signal slope bit (SBL) is zero (negative slope), and the LDiff signal 802 is in the zero state, and the RDiff signal 804 is in the sixth state or the fifth state, then the LDiff signal 802 and the RDiff signal 804 are not experiencing a direction change or a vibration and the vibration bit (VB2) is not set by the process 700. As described above, the vibration detection method 700 of FIGS. 7 and 7A waits for the next clock cycle of the CLK signal (FIGS. 2-5) to again enter the method of FIG. 7, at which time, the LDiff signal 802 and the RDiff signal 804 are in different states corresponding to another one of the decision blocks 702-758 of FIGS. 7 and 7A.

While the LDiff signal 802 and the RDiff signal 804 are shown to be sine waves having a ninety degree relationship, it will be understood that the LDiff signal 802 and the RDiff signal 804 can have different phase relationships and different shapes, resulting in different relative states achieved by the LDiff signal 802 and the RDiff signal 804. One different wave shape is shown, for example, in FIG. 9.

Figure 9:
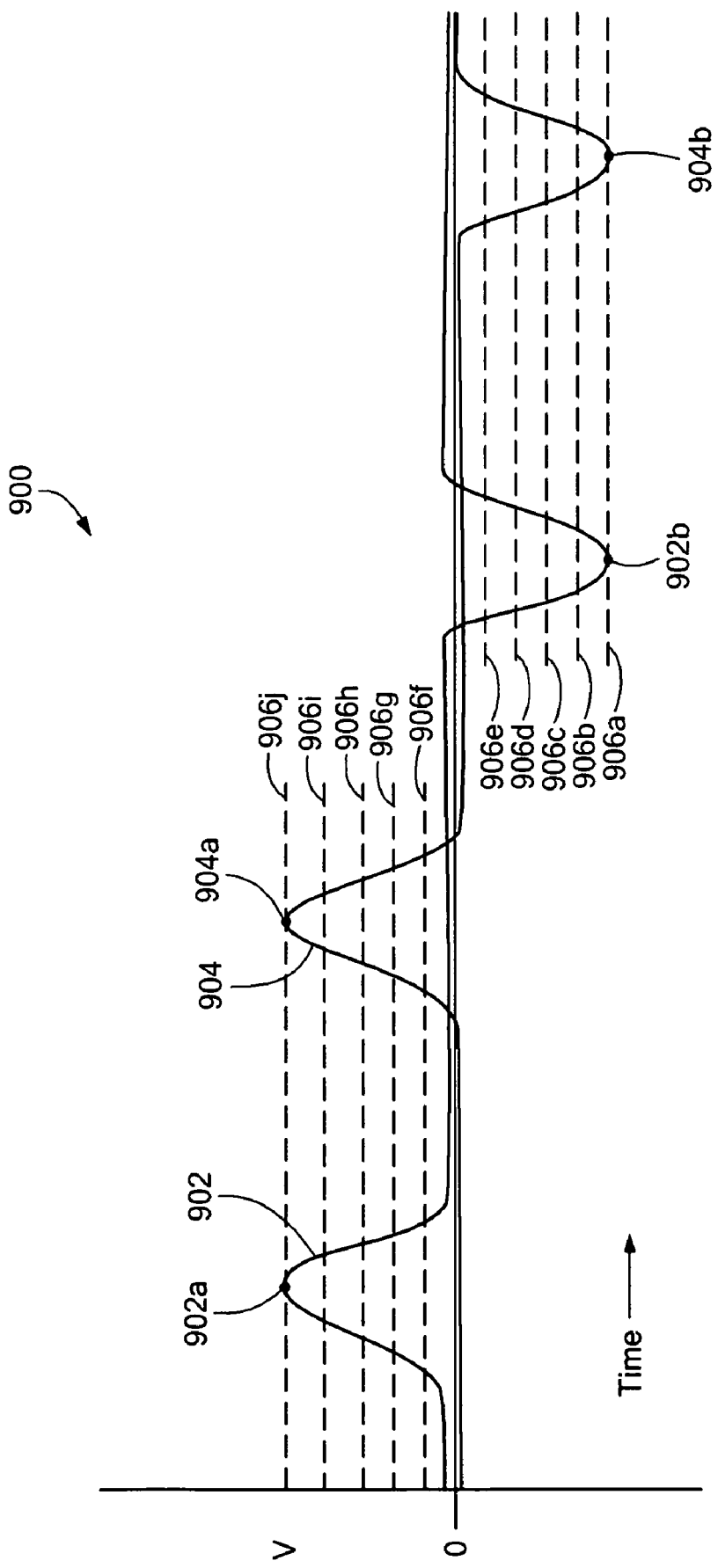
FIG. 9 is a graph showing other waveforms used to describe operation of the vibration detection process of FIGS. 7-7A.

Referring now to FIG. 9, a graph 900 has a horizontal scale in units of time and a vertical scale in units of voltage. A curve 902, having a positive peak 902a and a negative peak 902b, corresponds to an LDiff signal, for example the LDiff signal of FIG. 1. A curve 904, having a positive peak 904a and a negative peak 904b, corresponds to an RDiff signal, for example the RDiff signal of FIG. 1. It will be understood that the LDiff signal 902 and the RDiff signal 904 can be associated with a gear, for example, the gear 102 of FIG. 1, having widely spaced gear teeth.

The LDiff and RDiff signals 902,904, respectively, are shown to be approximately ninety degrees out of phase, however, the phase difference can be less than or greater than ninety degrees. Eight states are shown according to dashed lines 906a-906j. Taking the LDiff signal 902 as representative also of the RDiff signal 904, a state zero of the LDiff signal 902 is achieved when the LDiff signal 902 falls between the dashed lines 906a and 906c. A state one is achieved when the LDiff signal 902 falls between the dashed lines 906b and 906d, and so forth.

It can be seen that, in normal operation, in the absence of a direction change or a vibration, when the LDiff signal 902 is in the zero state and has a negative slope, (between dashed lines 906a and 906c) the RDiff signal 904 is in a different state, for example, the fourth state (see decision block 728, FIG. 7). Other examples can be found associated with each of the decision blocks 702-756 of FIGS. 7-7A.

Using the above example, referring again to FIG. 7, at decision block 728, when the LDiff signal slope bit (SB$_L$) is zero (negative slope), and the LDiff signal 902 is in the zero state, and the RDiff signal 804 is in the fourth state, then the LDiff signal 902 and the RDiff signal 904 are not experiencing a direction change or a vibration and the vibration bit (VB2) is not set by the process 700. As described above, the vibration detection method 700 of FIGS. 7 and 7A waits for the next clock cycle of the CLK signal (FIGS. 2-5) to again enter the method of FIG. 7, at which time, the LDiff signal 902 and the RDiff signal 904 are in different states corresponding to another one of the decision blocks 702-758 of FIGS. 7 and 7A.

Therefore, it will be appreciated that the values A1-A28 and B1-B28 of FIGS. 7 and 7A can be pre-selected to be state values related to the shape of the LDiff and RDiff waveforms. In another embodiment, the system 100 (FIG. 1) can learn the values for A1-A26 and B1-B26 during a factory calibration, or during an in-system calibration. In this way, one system 100 (FIG. 1) can be applied to a variety of applications associated with a variety of wave shapes. As described above, the number of states is not limited to A1-A28 and B1-B28.

Referring now to FIG. 10, a process 1000 can be used to detect a vibration in an object that rotates in normal operation generally without vibration, for example, the gear 102 of FIG. 1. It will be understood that the process 1000 applies to more than one state transition of the LDiff and RDiff signals (FIGS, 1, 8, 9).

Referring briefly again to FIG. 8, it will be understood that the states of the LDiff Signal 802 and RDiff signal 804 transition in the following "states sequences":

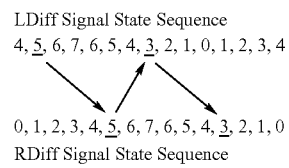

LDiff Signal State Sequence
4, 5, 6, 7, 6, 5, 4, 3, 2, 1, 0, 1, 2, 3, 4

0, 1, 2, 3, 4, 5, 6, 7, 6, 5, 4, 3, 2, 1, 0
RDiff Signal State Sequence

Underlined states connected by arrows in the above sequences are indicative of "selected states," which should occur in a predetermined "state pattern" (5L→5R→3L→3R). It will be understood that the selected states occurring in a different state pattern may be indicative of a vibration.

In the state pattern (5L→5R→3L→3R), the arrows are indicative of a pattern of states of the LDiff signal (L) and the RDiff signal (R). However, there can be intervening states between the selected states, which are associated with the arrows in the state pattern. For example, in the above state sequences, it can be seen that other states occur between states 5L and 5R. However, state 5L occurs before state 5R, as indicated by the associated arrow in the state pattern (5L→5R→3L→3R).

While the state pattern described above includes states of both the LDIFF and RDiff signals, in other embodiments, a state pattern having selected states of only one of the LDiff or RDiff signal can be used.

The LDiff signal 802 and the RDiff signal 804 of FIG. 8 are shown to be approximately ninety degrees out of phase, which phase is representative of a particular installation (i.e., position) of the magnetic field sensors 104a-104c (FIG. 1) in relation to a particular gear 102 (FIG. 1) and of the gear 102 having a particular spacing of teeth. It will be recognized that the relative phase of the LDiff signal 802 and the RDiff signal 804 (here ninety degrees) can be indicative of a proper installation of the proximity detector 100 (FIG. 1). For an installation in which one or more of the magnetic field sensors 104a-104c are skewed or otherwise misaligned with the gear 102, the relative phase can depart from that intended.

State patterns such as those described above can be used to identify not only a vibration, but also a correct installation of the proximity detector 100 versus an incorrect or misaligned installation. For example, a state pattern (5L→2R) is indicative of the fifth state occurring in the left channel before the second state occurs in the right channel. By inspection of the above state sequences, it can be seen that a relatively small shift of relative phase between the LDiff and RDiff signals can cause a violation of the state pattern (5L→2R). Therefore, some state patterns can be used to identify an incorrect installation of the proximity detector 100.

Referring briefly again to FIG. 9, it will be understood that the states of the LDiff Signal 902 and RDiff signal 904 transition in the same state sequences having the same state pattern as given above, remembering that the clock associated with state transitions, e.g., the CLK signal of FIG. 2, transitions only when a state transition occurs.

However, if instead, the horizontal axis of FIG. 9 were divided into equal time units and the states in the equal time units were considered, then it can be seen that the LDiff signal 902 and the RDiff signal 904 dwell in state 4, and the state sequences in equal time units can be expressed as follows:

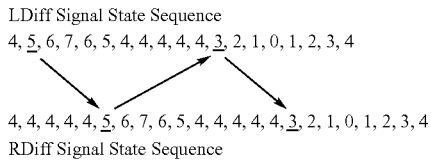

LDiff Signal State Sequence
4, 5, 6, 7, 6, 5, 4, 4, 4, 4, 4, 3, 2, 1, 0, 1, 2, 3, 4

4, 4, 4, 4, 4, 5, 6, 7, 6, 5, 4, 4, 4, 4, 4, 3, 2, 1, 0, 1, 2, 3, 4
RDiff Signal State Sequence Underlines states connected by arrows in the above states sequences are indicative of selected states, which should occur in the predetermined state pattern (5L→5R→3L→3R), which is the sane as the state pattern described above, which is associated with the waveforms of FIG. 8. It will again be understood that the selected states occurring in a different state pattern may be indicative of a vibration.

Referring again to FIG. 10, the process 1000 begins at decision block 1002, where if the left channel state (LDiff) is state five before the right channel state (RDiff) is state five, then the process proceeds to decision block 1004.

At decision block 1004, if the right channel state (RDiff) is state five before the left channel state (LDiff) is state three, then the process proceeds to decision block 1006.

At decision block 1006, if the left channel state (LDiff) is state three before the right channel state (RDiff) is state three, then the process proceeds to decision block 1008.

At decision block 1008, if the right channel state (RDiff) is state three before the left channel state (LDiff) is state five, the process proceeds to block 1010, where a third vibration bit (VB3) is cleared to zero, which is indicative of no vibration.

If any of the conditions of decision blocks 1002-1008 is not met, then the process proceeds to block 1012, where the third vibration bit (VB3) is set to 1, which is indicative of a vibration.

While the process 1000 is shown to end after block 1010, in other embodiments, the process returns instead to decision block 1002, essentially looping continually, or looping for any predetermined number of times.

The decision blocks 1002-1008 can be seen to be representative of the predetermined state pattern (5L→5R→3L→3R) of selected states in the above-described state sequences. As described above, intervening states can occur between the selected states.

Whiles the above-described state pattern is (5L→5R→3L→3R), in other embodiments, another state pattern can be used, having other selected states, including a state pattern that is not the same for different LDiff and RDiff signal waveforms as shown, for example, in FIGS. 8 and 9. In other embodiments, the state pattern can include more than four or fewer than four selected states, any deviation from which will set the vibration bit (VB3). In some embodiments, the state pattern includes selected states associated with only one of the LDiff signal and the RDiff signal.

In some embodiments, the state pattern and the selected states therein can be learned, for example, at startup, and thus, can be tailored to particular LDiff and RDiff waveforms. In other embodiments, the state pattern having the selected states is programmed for a particular application, for example, at time of installation of the proximity detector.

It should be understood that the state pattern, e.g., the state pattern (5L→5R→3L→3R), can reverse upon a change in direction of the gear, for example, the gear 102 of FIG. 1, becoming (3R→3L→5R→5L). In an alternate arrangement, upon a change in direction, the process 1000 can include decision blocks to also detect the reversed state pattern and does not set the vibration bit (VB3) if the reverse direction is detected. In this embodiment, the vibration bit (VB3) is set only if the forward and reverse directions are not detected.

In some embodiments, the vibration bit (VB3) of FIG. 10 is a different vibration bit than the one or two vibration bits (VB1$_L$, VB1$_R$) described in conjunction with FIG. 6 and the vibration bit VB2 described in conjunction with FIGS. 7 and 7A. However, in other embodiments, the vibration bits generated by the process 600 of FIG. 6, the process 700 of FIGS. 7 and 7A, and the process 1000 of FIG. 10 are combined to provide one vibration bit (VB).

Subsequent processing (FIG. 11) can make use of the vibration bit (VB3) provided by the process 1000 to determine whether a vibration or a change in direction of rotation has occurred. Subsequent processing (FIG. 11) can also reset the vibration bit (VB3), for example, if the determination indicates a change in direction of rotation of the gear 102, rather than a vibration.

Referring now to FIG. 1, a process begins at decision block 1102, where, if the third vibration bit (VB3) is set, then the process proceeds to block 1104, where the output signal 124 (FIG. 1) is stopped. In an alternate embodiment, the output signal 124 is encoded to be indicative of a vibration.

It should be recognized that the third vibration bit (VB3) is a "strong" vibration bit, and is the only vibration bit that can stop the output signal 124, or otherwise encode the output signal 124 to be indicative of a vibration.

At decision block 1106, if the third vibration bit (VB3) has been zero (unset) for at least N clock cycles of the CLK signal (FIG. 2) then the process proceeds to decision block 1108. Otherwise, the process loops at the decision block 1106, during which time the output signal 124 remains stopped or otherwise encoded to be indicative of the vibration. In one particular embodiment, the value of N is approximately thirty, which is indicative of two complete cycles of the LDiff signal and the RDiff signal (FIG. 1).

At decision block 1108, if any of the other vibration bits (VB1$_L$, VB1$_R$, VB2) are set to one, indicative of a vibration, then the process returns to decision block 1106, and the output signal 124 remains stopped or otherwise encoded to indicate a vibration. However, if all of the other vibration bits (VB1$_L$, VB1$_R$, VB2) are not set to one, the process proceeds to block 1110, where the other vibration bits (VB1$_L$, VB1$_R$, VB2) are reset to zero.

At block 1112, the output signal 124 is started again, or, in another embodiment, encoded to be indicative of no vibration.

From the above discussion, it should be apparent that the other vibration bits ($VB1_L$, $VB1_R$, VB2) are "weak" vibration bits, not having the power to stop the output signal 124, but having the power to keep the output signal 124 stopped once stopped by the third vibration bit (VB3). In other embodiments, it should be recognized that the vibration bits ($VB1_L$, $VB1_R$, VB2, VB3) can be strong vibration bits or weak vibration bits, it any combination. In still other embodiments, any one or more of the vibration bits ($VB1_L$, $VB1_R$, VB2, VB3) and associated methods 600, 700, 1000, respectively, are omitted.

As described above in conjunction with FIG. 10, one or more state patterns can also be used to identify a correct installation of the proximity detector 100 (FIG. 1). With this arrangement, the output signal 124 can be further encoded to be indicative of the correct (or incorrect) installation. However, in another embodiment another output signal (not shown) is provided which is indicative of the correct (or incorrect) installation. The indication of the correct installation can be provided, for example, at the time of installation of the proximity detector 100, or at any other time.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A proximity detector, comprising:
one or more magnetic field sensing elements adapted to provide a respective one or more magnetic field signals indicative of a magnetic field associated with an object, wherein each one of the one or more magnetic field signals is an analog signal having respective analog signal values; and
one or more state processors to provide a respective one or more state signals, wherein each one of the one or more state signals is indicative of a plurality of states associated with a respective one of the one or more magnetic field signals, wherein each one of the plurality of states is indicative of a respective range of the respective analog signal values.

2. The proximity detector of claim 1, further including a vibration processor adapted to generate a vibration signal indicative of a vibration of at least one of the object and the one or more magnetic field sensing elements in response to the one or more state signals.

3. The proximity detector of claim 2, wherein the vibration processor is adapted to generate the vibration signal according to a change of a slope of a selected one of the one or more magnetic field signals concurrent with at least one selected state from among the plurality of states of another one of the one or more magnetic field signals.

4. The proximity detector of claim 2, wherein the one or more magnetic field signals include a first magnetic field signal and a second magnetic field signal, and wherein the vibration processor is adapted to generate the vibration signal according to a comparison of a state of the first magnetic field signal with a state of the second magnetic field signal from among the plurality of states.

5. The proximity detector of claim 2, wherein the one or more magnetic field signals include a first magnetic field signal and a second magnetic field signal, and wherein the vibration processor is adapted to generate the vibration signal according to a state pattern of at least one of the first magnetic field signal and the second magnetic field signal, the state pattern having selected states from among the plurality of states.

6. The proximity detector of claim 2, wherein the one or more magnetic field signals include a first magnetic field signal and a second magnetic field signal, wherein the vibration processor is adapted to generate at least one of a first vibration signal according to a change of a slope of a selected one of the one or more magnetic field signals concurrent with at least one selected state from among the plurality of states of another one of the one or more magnetic field signals, a second vibration signal according to a comparison of a state of the first magnetic field signal with a state of the second magnetic field signal from among the plurality of states, and a third vibration signal according to a state pattern of at least one of the first magnetic field signal and the second magnetic field signal, the state pattern having selected states from among the plurality of states.

7. The proximity detector of claim 6, further including an output protocol processor adapted to generate an output signal indicative of a rotation of the object and indicative of the vibration in response to the one or more state signals and in response to at least one of the first vibration signal, the second vibration signal, and the third vibration signal.

8. The proximity detector of claim 7, wherein the output signal is originally indicative of the vibration only in response to selected ones of the first vibration signal, the second vibration signal, and the third vibration signal.

9. The proximity detector of claim 2, further including an output protocol processor adapted to generate an output signal indicative of a rotation of the object and indicative of the vibration in response to the one or more state signals and in response to the vibration signal.

10. The proximity detector of claim 1, further including an output protocol processor adapted to generate an output signal indicative of a rotation of the object in response to the one or more state signals.

11. The proximity detector of claim 1, further including an output protocol processor adapted to generate an output signal indicative of a correct installation of the proximity detector in response to the one or more state signals.

12. A method of detecting an object, comprising:
generating one or more magnetic field signals indicative of a magnetic field associated with the object, wherein each one of the one or more magnetic field signals is an analog signal having respective analog signal values; and
generating one or more state signals, wherein each one of the one or more state signals is indicative of a plurality of states associated with a respective one of the one or more magnetic field signals, wherein each one of the plurality of states is indicative of a respective range of the respective analog signal values.

13. The method of claim 12, further including:
generating a vibration signal indicative of a vibration of at least one of the object and the one or more magnetic field sensing elements in response to the one or more state signals.

14. The method of claim 13, further including:
generating the vibration signal according to a change of a slope of a selected one of the one or more magnetic field signals concurrent with at least one selected state from among the plurality of states of another one of the one or more magnetic field signals.

15. The method of claim 13, wherein the one or more magnetic field signals include a first magnetic field signal and a second magnetic field signal, the method further including:
generating the vibration signal according to a comparison of a state of the first magnetic field signal with a state of the second magnetic field signal from among the plurality of states.

16. The method of claim 13, wherein the one or more magnetic field signals include a first magnetic field signal and a second magnetic field signal, the method further including:
generating the vibration signal according to a state pattern of at least one of the first magnetic field signal and the second magnetic field signal, the state pattern having selected states from among the plurality of states.

17. The method of claim 13, wherein the one or more magnetic field signals include a first magnetic field signal and a second magnetic field signal, the method further including:
generating at least one of a first vibration signal according to a change of a slope of a selected one of the one or more magnetic field signals concurrent with at least one selected state from among the plurality of states of another one of the one or more magnetic field signals, a second vibration signal according to a comparison of a state of the first magnetic field signal with a state of the second magnetic field signal from among the plurality of states, and a third vibration signal according to a state pattern of at least one of the first magnetic field signal and the second magnetic field signal, the state pattern having selected states from among the plurality of states.

18. The method of claim 17, further including:
generating an output signal indicative of a rotation of the object and indicative of the vibration in response to the one or more state signals and in response to at least one of the first vibration signal, the second vibration signal, and the third vibration signal.

19. The method of claim 18, wherein the output signal is originally indicative of the vibration only in response to selected ones of the first vibration signal, the second vibration signal, and the third vibration signal.

20. The method of claim 13, further including:
generating an output signal indicative of a rotation of the object and indicative of the vibration in response to the one or more state signals and in response to the vibration signal.

21. The method of claim 12, further including:
generating an output signal indicative of a rotation of the object in response to the one or more state signals.

22. The proximity detector of claim 12, further including generating an output signal indicative of a correct installation of the proximity detector in response to the one or more state signals.

* * * * *

UNITED STATES PATENT AND TRADEMARK OFFICE
CERTIFICATE OF CORRECTION

PATENT NO.        : 7,253,614 B2  
APPLICATION NO.   : 11/085648  
DATED             : August 7, 2007  
INVENTOR(S)       : Forrest et al.

It is certified that error appears in the above-identified patent and that said Letters Patent is hereby corrected as shown below:

Column 6, line 1 delete "is" and replace with --it--.

Column 7, line 38 delete "threshold" and replace with --thresholds--.

Column 8, line 42 delete "peak to peak" and replace with --peak-to-peak--.

Column 9, line 54 delete "transition" and replace with --transitions--.

Column 10, line 46 delete "stated the" and replace with --stated, the--.

Column 11, line 50 delete "(SBR)" and replace with --$(SB_R)$--.

Column 13, line 10 delete "(SBL)" and replace with --$(SB_L)$--.

Column 14, line 51 delete "signal" and replace with --signals--.

Column 16, line 1 delete "whiles" and replace with --while--.

Column 16, line 42 delete "FIG. 1," and replace with --FIG. 11,--.

Column 17, line 11 delete "it" and replace with --in--.

Column 17, line 20 delete "embodiment another" and replace with --embodiment, another--.

Signed and Sealed this

Fourth Day of November, 2008

JON W. DUDAS  
*Director of the United States Patent and Trademark Office*